United States Patent
Hoshi et al.

(10) Patent No.: US 8,831,832 B2
(45) Date of Patent: Sep. 9, 2014

(54) MOTOR CONTROL APPARATUS AND ELECTRIC POWER STEERING APPARATUS PROVIDED WITH THE SAME

(71) Applicant: NSK Ltd., Tokyo (JP)

(72) Inventors: Yuzuru Hoshi, Maebashi (JP); Toru Sakaguchi, Maebashi (JP); Sachio Nakayama, Maebashi (JP); Masahiro Maeda, Shinagawa-ku (JP); Kenji Mori, Tokyo (JP); Yousuke Imamura, Shinagawa-ku (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/234,176

(22) PCT Filed: Mar. 28, 2013

(86) PCT No.: PCT/JP2013/059198
§ 371 (c)(1),
(2), (4) Date: Jan. 22, 2014

(87) PCT Pub. No.: WO2013/150948
PCT Pub. Date: Oct. 10, 2013

(65) Prior Publication Data
US 2014/0156144 A1 Jun. 5, 2014

(30) Foreign Application Priority Data

Apr. 4, 2012 (JP) ................. 2012-085239

(51) Int. Cl.
*A01B 69/00* (2006.01)
*H02P 21/00* (2006.01)
*B62D 5/04* (2006.01)
*H02P 6/08* (2006.01)
*B60T 8/1755* (2006.01)
*B62D 6/00* (2006.01)
*B62D 7/15* (2006.01)

(52) U.S. Cl.
CPC ............ *H02P 21/0035* (2013.01); *B62D 5/046* (2013.01); *H02P 6/08* (2013.01); *B60T 8/1755* (2013.01); *B62D 6/003* (2013.01); *B62D 5/0463* (2013.01); *B62D 7/159* (2013.01); *B62D 6/008* (2013.01)
USPC .......................... 701/41; 318/811; 318/400.23

(58) Field of Classification Search
CPC ...... B62D 5/0463; B62D 7/159; B62D 6/008; B62D 6/003; B60T 8/1755
USPC ............... 701/42; 318/244, 400.02, 729, 811, 318/801, 719, 701, 400.23; 417/212, 18
See application file for complete search history.

(56) References Cited

U.S. PATENT DOCUMENTS 7,346,475 B2 * 3/2008 Dimino et al. ................ 702/185
8,474,570 B2 * 7/2013 Yanai ............................ 180/446

(Continued)

FOREIGN PATENT DOCUMENTS

| JP | 2007-330077 A | 12/2007 |
|---|---|---|
| JP | 2009-131069 A | 6/2009 |

(Continued)

OTHER PUBLICATIONS

International Search Report for PCT/JP2013/059198 dated Jun. 18, 2013.

*Primary Examiner* — Behrang Badii
(74) *Attorney, Agent, or Firm* — Sughrue Mion, PLLC

(57) ABSTRACT

A motor control apparatus that is capable of making the whole control system robust not only with respect to motor parameter variations such as the temperature variation and the manufacturing unevenness but also with respect to disturbances while using a cheap and compact one-shunt type current detecting circuit and simultaneously diagnosing an estimation error and an electric power steering apparatus provide with the motor control apparatus.

10 Claims, 15 Drawing Sheets

(56) References Cited

U.S. PATENT DOCUMENTS

| | | | |
|---|---|---|---|
| 8,706,354 B2 * | 4/2014 | Imamura et al. | 701/42 |
| 2007/0296375 A1 * | 12/2007 | Sakaguchi et al. | 318/811 |
| 2011/0264331 A1 * | 10/2011 | Imamura et al. | 701/42 |
| 2012/0211299 A1 * | 8/2012 | Yanai | 180/446 |

FOREIGN PATENT DOCUMENTS

| | | |
|---|---|---|
| JP | 2009-189552 A | 8/2009 |
| JP | 2010-029028 A | 2/2010 |
| JP | 2010-207087 A | 9/2010 |

* cited by examiner

PRIOR ART

PRIOR ART

PRIOR ART

PRIOR ART

MOTOR CONTROL APPARATUS AND ELECTRIC POWER STEERING APPARATUS PROVIDED WITH THE SAME

CROSS REFERENCE TO RELATED APPLICATIONS

This application is a National Stage of International Application No. PCT/JP2013/059198 filed Mar. 28, 2013, claiming priority based on Japanese Patent Application No. 2012-085239, filed Apr. 4, 2012, the contents of all of which are incorporated herein by reference in their entirety.

TECHNICAL FIELD

The present invention relates to a motor control apparatus that comprises an adaptive current observer to estimate a current of a motor and simultaneously diagnoses (watches) an estimation error of the adaptive current observer, in a case of detecting abnormality, forcibly makes a current-detection-possible state by limiting duty and switches to a current control based on a detected current, and to an electric power steering apparatus provided with the same.

BACKGROUND ART

An electric power steering apparatus that assist-controls a steering system of a vehicle by using a rotational torque of a motor, applies a driving force of the motor as a steering assist torque to a steering shaft or a rack shaft by means of a transmission mechanism such as gears or a belt through a reduction mechanism. And then, in order to supply a current to the motor so that the motor generates a desired torque, an inverter is used in a motor drive circuit.

A general configuration of a conventional electric power steering apparatus will be described with reference to FIG. 1. As shown in FIG. 1, a column shaft (a steering shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (an ECU) 100 for controlling the electric power steering apparatus from a battery 13, and an ignition key signal is inputted into the control unit 100 through an ignition key 11. The control unit 100 calculates a current command value of an assist (steering assist) command based on a steering torque Tr detected by the torque sensor 10 and a velocity Vs detected by a velocity sensor 12, and controls a current I supplied to the motor 20 based on a voltage command value E obtained by performing compensation and so on with respect to the current command value in a current control section. Furthermore, it is also possible to receive the velocity Vs from a CAN (Controller Area Network) and so on.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque Tr detected by the torque sensor 10 and the velocity Vs detected by the velocity sensor 12 are inputted into a current command value calculating section 101. The current command value calculating section 101 decides a current command value Iref1 that is the desired value of the current supplied to the motor 20 such as a three-phase motor based on the steering torque Tr and the velocity Vs and by means of an assist map or the like. The current command value Iref1 is added in an addition section 102A and then the added value is inputted into a current limiting section 103 as a current command value Iref2. A current command value Iref3 that is limited the maximum current, is inputted into a subtraction section 102B, and a deviation Iref4 ($=$Iref3$-i_m$) between the current command value Iref3 and a motor current value $i_m$ that is fed back, is calculated. The deviation Iref4 is inputted into a current control section 104 that performs PI-control and so on. The voltage command value E that characteristic improvement is performed in the current control section 104, is inputted into a PWM control section 105. Furthermore, the motor 20 is PWM-driven through an inverter 106 serving as a drive section. The current value $i_m$ of the motor 20 is detected by a current detecting circuit 120 within the inverter 106 and is fed back to the subtraction section 102B. In general, the inverter 106 uses EFTs as switching elements and is comprised of a bridge circuit of FETs.

Further, a compensation signal CM from a compensation section 110 is added in the addition section 102A, and the compensation of the system is performed by the addition of the compensation signal CM so as to improve a convergence, an inertia characteristic and so on. The compensation section 110 adds a self-aligning torque (SAT) 113 and an inertia 112 in an addition section 114, further adds the result of addition performed in the addition section 114 and a convergence 111 in an addition section 115, and then outputs the result of addition performed in the addition section 115 as the compensation signal CM.

In a case of performing a vector control based on d-q axes with respect to the motor 20, a resolver 21 acting as a rotation sensor is connected to the motor 20 and simultaneously an angular speed calculating section 22 to calculate an angular speed ω based on a rotational angle θ is provided. In a case that the motor 20 is a three-phase (U-phase, V-phase and W-phase) brushless DC motor, details of the PWM control section 105 and the inverter 106 is a configuration such as shown in FIG. 3. The PWM control section 105 comprises a duty calculating section 105A that calculates PWM-duty command values D1~D6 of three phases according to a given expression based on the voltage command value E, and a gate driving section 105B that switches ON/OFF after driving each gate of FET1~FET6 by the PWM-duty command values D1~D6. The inverter 106 comprises a three-phase bridge having top and bottom arms comprised of an upper-FET1 and a lower-FET4 of U-phase, top and bottom arms comprised of an upper-FET2 and a lower-FET5 of V-phase, and top and bottom arms comprised of an upper-FET3 and a lower-FET6 of W-phase, and drives the motor 20 by being switched ON/OFF based on the PWM-duty command values D1~D6.

Further, electric power is supplied to the inverter 106 from the battery 13 via a power relay 14, and a dead time compensation value for compensating each dead time of the FET1~FET6 of the inverter 106 is inputted and added to the PWM-duty command values D1~D6 of the PWM control section 105.

In such a configuration, although it is necessary to measure a drive current of the inverter 106 or a motor current of the motor 20, as one of request items of downsizing, weight saving and cost-cutting of the control unit 100, it is singulation of the current detecting circuit 120 (one-shunt type current detecting circuit). A one-shunt type current detecting circuit is known as the singulation of a current detecting circuit, and for example, the configuration of the one-shunt type current detecting circuit 120 is shown in FIG. 4 (Japanese Published Unexamined Patent Application No. 2009-131064A). That is to say, a one-shunt resistor R1 is connected between the bottom arm of the FET bridge and ground (GND), a fall voltage that is caused by the shunt resistor R1 when a current flowed in the FET bridge, is converted into a current value Ima by an operational amplifier (a differential amplifying circuit) 121 and resistors R2~R4, and further an A/D converting section 122 A/D-converts the current value Ima at a given timing via a filter comprised of a resistor R6 and a capacitor C1 and then outputs a current value $i_m$ that is a digital value. Moreover, a reference voltage of "2.5V" is connected to a positive terminal input of the operational amplifier 121 via a resistor R5.

FIG. 5 shows a wiring diagram of the battery 13, the inverter 106, the current detecting circuit 120 and the motor 20, and simultaneously shows a current pathway (indicated by a dashed line) during a state that the upper-FET1 of U-phase is turned ON (the lower-FET4 of U-phase is turned OFF), the upper-FET2 of V-phase is turned OFF (the lower-FET5 of V-phase is turned ON), and the upper-FET3 of W-phase is turned OFF (the lower-FET6 of W-phase is turned ON). Further, FIG. 6 shows a current pathway (indicated by a dashed line) during a state that the upper-FET1 of U-phase is turned ON (the lower-FET4 of U-phase is turned OFF), the upper-FET2 of V-phase is turned ON (the lower-FET5 of V-phase is turned OFF), and the upper-FET3 of W-phase is turned OFF (the lower-FET6 of W-phase is turned ON). It is clear from these current pathways of FIG. 5 and FIG. 6 that the total value of phases that the upper-FET is turned ON, appears in the current detecting circuit 120 as a detected current. That is, it is possible to detect a U-phase current in FIG. 5, and it is possible to detect the U-phase current and a V-phase current in FIG. 6. This is the same as in the case that the current detecting circuit 120 is connected between the top arm of the inverter 106 and the power supply. Furthermore, in FIG. 5 and FIG. 6, the connections of the resolver 21 and the power relay 14 are omitted.

In the above-described motor control system, in order not to output influences of detection disturbances of a motor current detected-value, it is impossible to enhance a control response very much, and a limitation is imposed on suppression of parameter variations of the motor 20 and the control unit 100 and disturbances of a motor input voltage. Therefore, in order to obtain a highly-robust control method with high response while suppressing the influences of the detection disturbances of the motor current detected-value, in general, a method that mitigates influences of current detection noises to some extent by setting the current detected-value used in current control as an estimated-current and thereby enhances a response of the current control and improves operation sound performance and torque ripple performance, is thought about.

In Patent Document 1, a method and an apparatus that inputs d-q axes voltage command values of a vector control, calculates d-q axes estimated-currents by means of a d-q axes current observer and performs a feedback control, are disclosed. In the method and the apparatus, a scheme that enhances robustness by making each parameter of a current observer model dependent on temperature detected-value of each element and varying, is proposed. Further, in Patent Document 2, a motor control apparatus that estimates a motor current vale after several sampling periods based on a voltage command value, a motor current detected-value and input estimation disturbances of a motor that is estimated by a disturbance observer, uses this motor current estimated-value in control, and a current observer corresponds to variations in the model parameters by a state feedback, is proposed.

THE LIST OF PRIOR ART DOCUMENTS

Patent Documents

Patent Document 1: Japanese Published Unexamined Patent Application (Translation of PCT Application) No. 2009-526511 A
Patent Document 2: Japanese Patent No. 4045747
Patent Document 3: Japanese Published Unexamined Patent Application No. 2009-131069 A
Patent Document 4: Japanese Published Unexamined Patent Application No. 2009-124782 A

SUMMARY OF THE INVENTION

Problems to be Solved by the Invention

However, the variation in each parameter of the motor includes not only a temperature variation but also a variation due to a current pathway variation that is caused by manufacturing unevenness, aging degradation and current regeneration etc., by using the control method disclosed in the Patent Document 1 that corrects only the temperature, there is a problem that it is not enough to keep an estimation precision. Further, in the apparatus disclosed in the Patent Document 2, current detection disturbances that do not become a real motor current, are included in the disturbances estimated by the disturbance observer. Since the estimated-current is in conformity with a value that the current detection disturbances are included in, there is a problem that with respect to the current detection disturbances, the whole control system does not become robust. With respect to the above problems, although it is thought that it is possible to decreases a state feedback gain and lowers a natural response frequency of the observer by using the configuration of the Patent Document 2 so that the current detection disturbances are not calculated as estimated-values, since a response with respect to parameter variations of an estimating subject model also drops simultaneously, it is also thought that there is a problem that an error of the estimated-current broadens.

The present invention has been developed in view of the above-described circumstances, and an object of the present invention is to provide a motor control apparatus that is capable of making the whole control system robust not only with respect to motor parameter variations such as the temperature variation and the manufacturing unevenness but also with respect to disturbances while using a cheap and compact one-shunt type current detecting circuit and simultaneously diagnosing an estimation error, in a case of detecting abnormality, forcibly makes a current-detection-possible state by limiting duty and switches to a current control based on a detected current and an electric power steering apparatus provide with the motor control apparatus.

Means for Solving the Problems

The present invention relates to a motor control apparatus comprising a current detecting circuit to detect a current of a motor as a current detected-value, a drive control unit to drive and control the motor with duty based on a voltage command value determined based on at least a current command value, and a rotation detecting unit to detect an angle and an angular speed of the motor, the above-described object of the present invention is achieved by that the motor control apparatus further comprising: an adaptive current observer to identify parameter variations of an output model of the motor, to calculate a current estimated-value of the motor and to use the current estimated-value for a calculation of the voltage command value; an adaptive identifying diagnosis section to diagnose an estimation error of the current estimated-value outputted from the adaptive current observer; and a current-detection-impossible state detecting section to detect a current-detection-impossible state that a detection of the current detected-value is impossible; wherein the adaptive identifying diagnosis section diagnoses the estimation error of the current estimated-value based on the current estimated-value, the current detected-value, the angle and the current-detection-impossible state and forcibly makes a current-detection-possible state by limiting the duty based on a diagnosis result of the adaptive identifying diagnosis section, and a control of the motor is switched to a current control based on a detected current.

Further, the above-described object of the present invention is more effectively achieved by that wherein the current detecting circuit is a one-shunt current detecting type; or wherein the drive control unit is constructed by a vector control system of d-q axes, and the adaptive identifying diagnosis section comprising: a q-axis current calculating section to calculate a detected q-axis current value and an estimated q-axis current value based on the current estimated-value, the current detected-value and the angle; a current-detection-impossible state continuation watching section to watch a continuation of a current-detection-impossible state; an estimated-current each-phase sum watching section to watch an each-phase sum based on the current estimated-value; a q-axis difference watching section to watch a detection-estimation q-axis difference based on the current-detection-impossible state, the detected q-axis current value and the estimated q-axis current value; an estimated q-axis-change difference watching section to watch an estimated q-axis-change difference based on the current-detection-impossible state, the estimated q-axis current value and an estimated q-axis current value just before the current-detection-impossible state; and a synthesis valuing section to synthetically value watched results of the current-detection-impossible state continuation watching section, the estimated-current each-phase sum watching section, the q-axis difference watching section and the estimated q-axis-change difference watching section; or wherein the synthesis judging section outputs an observer diagnosis-abnormal flag for limiting the duty or a drive stop flag for stopping an assist; or wherein the adaptive current observer comprises an adaptive identifying unit to identify the parameter variations of the output model of the motor, a current estimating unit to estimate a current of the motor and a voltage command value determining unit to determine the voltage command value.

Moreover, the above-described object is also achieved by that an electric power steering apparatus is provided with the above-described motor control apparatus.

Effects of the Invention

Since the present invention sequentially identifies parameters of a motor model by means of an adaptive identifying section, estimates a motor current by using parameter identification results of the adaptive identifying section and simultaneously performs a diagnosis for adaptive identification, becomes a robust configuration with respect to the motor parameter variations such as the temperature variation and the manufacturing unevenness, it is possible to further enhance the estimation precision and improve the operation sound performance and the torque ripple performance effectively and remarkably. Further, in the present invention, since one-shunt current detecting type is used in the detection of the motor current, a cheap and compact configuration becomes possible.

Further, since the present invention varies the responses to a level that influences of the current detection disturbances are not outputted as an estimated-value in an operation state that the influences of the current detection disturbances appear greatly such as a steering-holding state, by varying responses of the adaptive identifying section and a current estimating section based on the operation state of the motor, it is possible to suppress the current detection disturbances with respect to the estimated-current used in deciding the voltage command value, it is possible to increase the responses with an easy current control configuration, and further it is possible to certainly improve the operation sound performance and the torque ripple performance.

Furthermore, in general, in a case that detecting type of the motor current is one-shunt current detecting type, there is a state that it is impossible to detect a phase current in accordance with duty (duty ratio) in a PWM (Pulse Width Modulation) control. However, according to the present invention, since diagnose the estimation error of the estimated-current, in the case of detecting abnormality, forcibly makes the current-detection-possible state by limiting the duty and switches to the current control based on the detected current, even in the case that the electric power steering apparatus detects the abnormality, it is possible to continue the assist and steer safely.

MODE FOR CARRYING OUT THE INVENTION

At first, an adaptive current observer being the presupposition of the present invention will be described.

Figure 1:
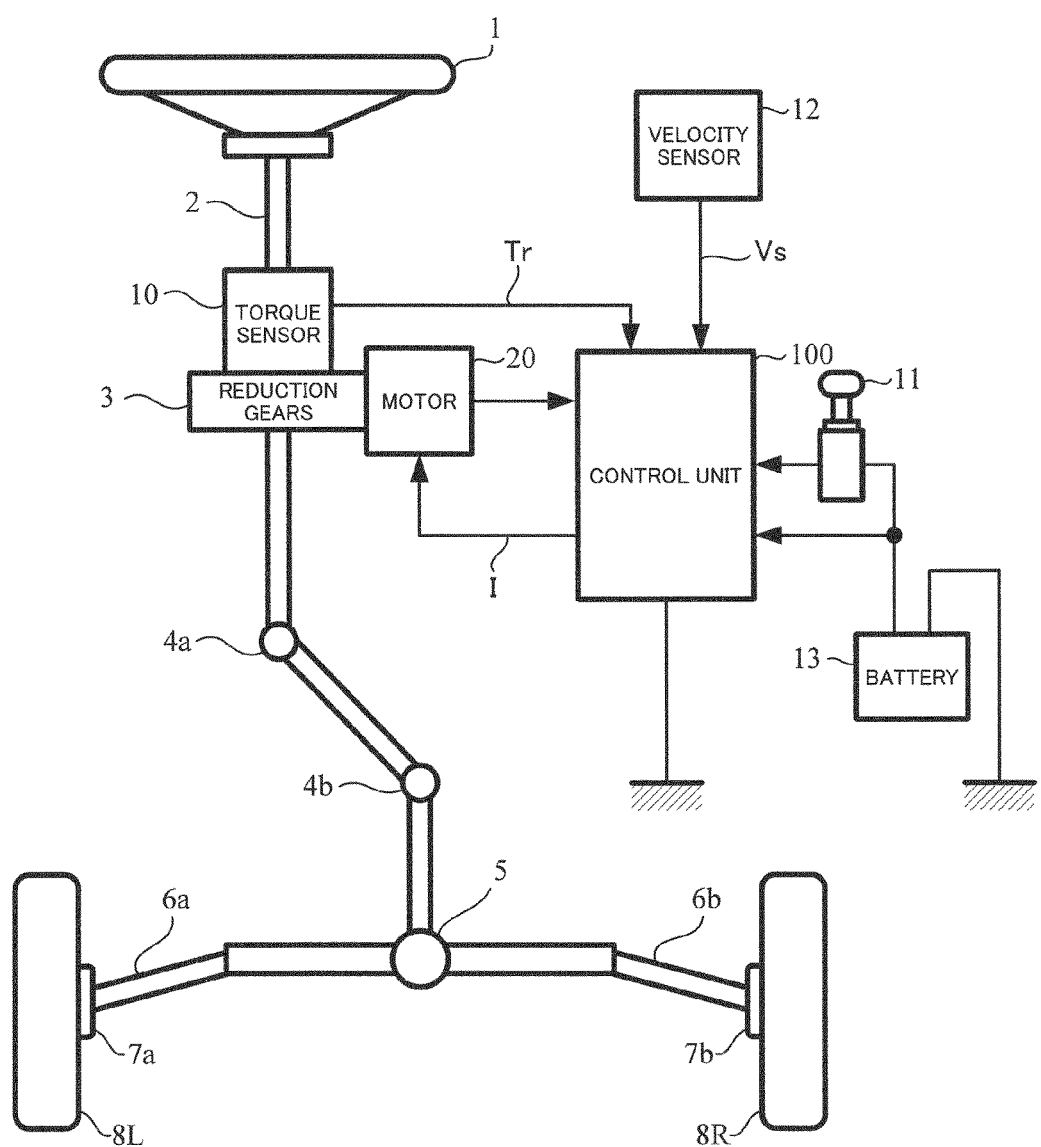
FIG. 1 is a diagram showing a configuration example of a general electric power steering apparatus.
Figure 2:
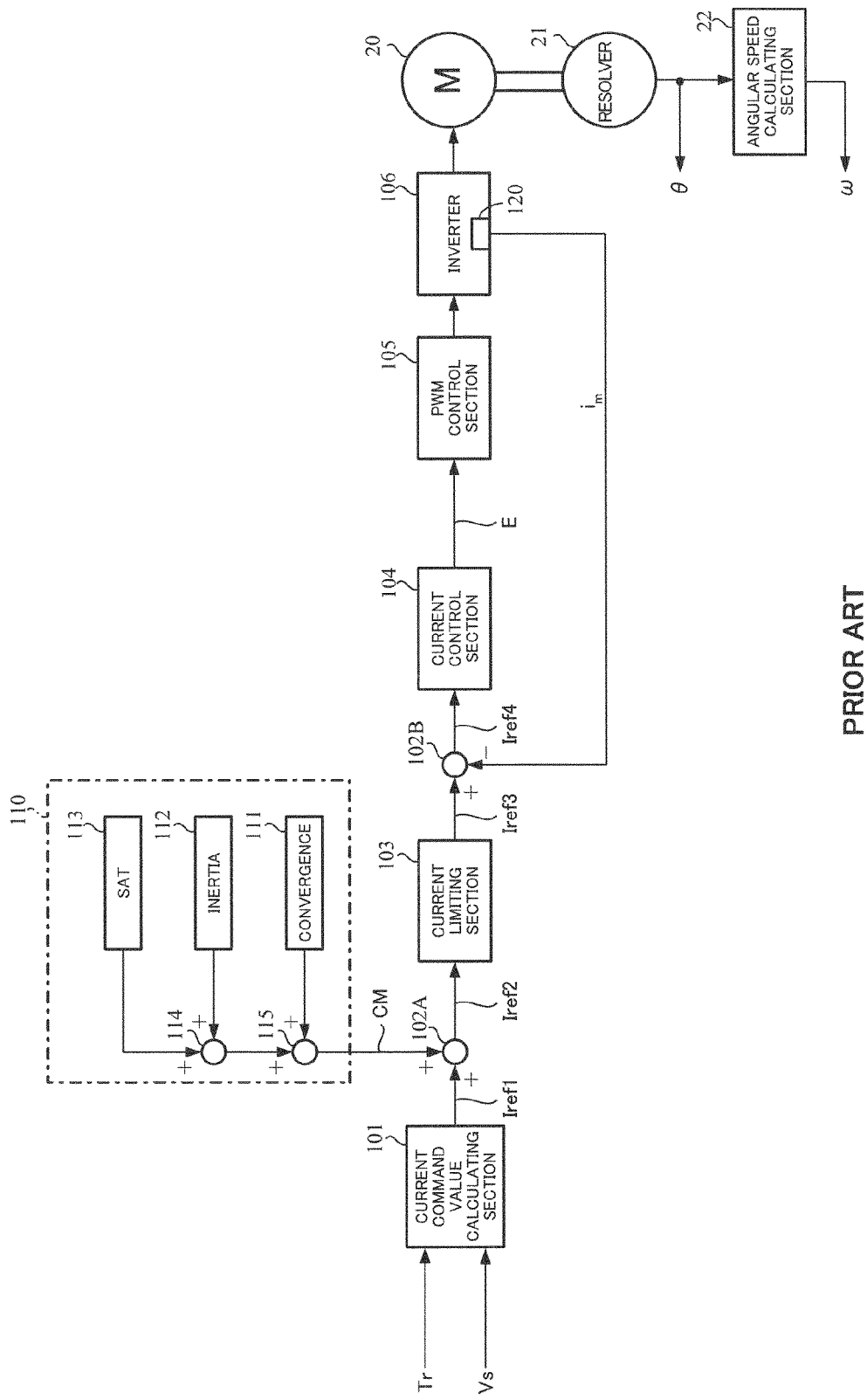
FIG. 2 is a block diagram showing one example of a control unit.
Figure 3:
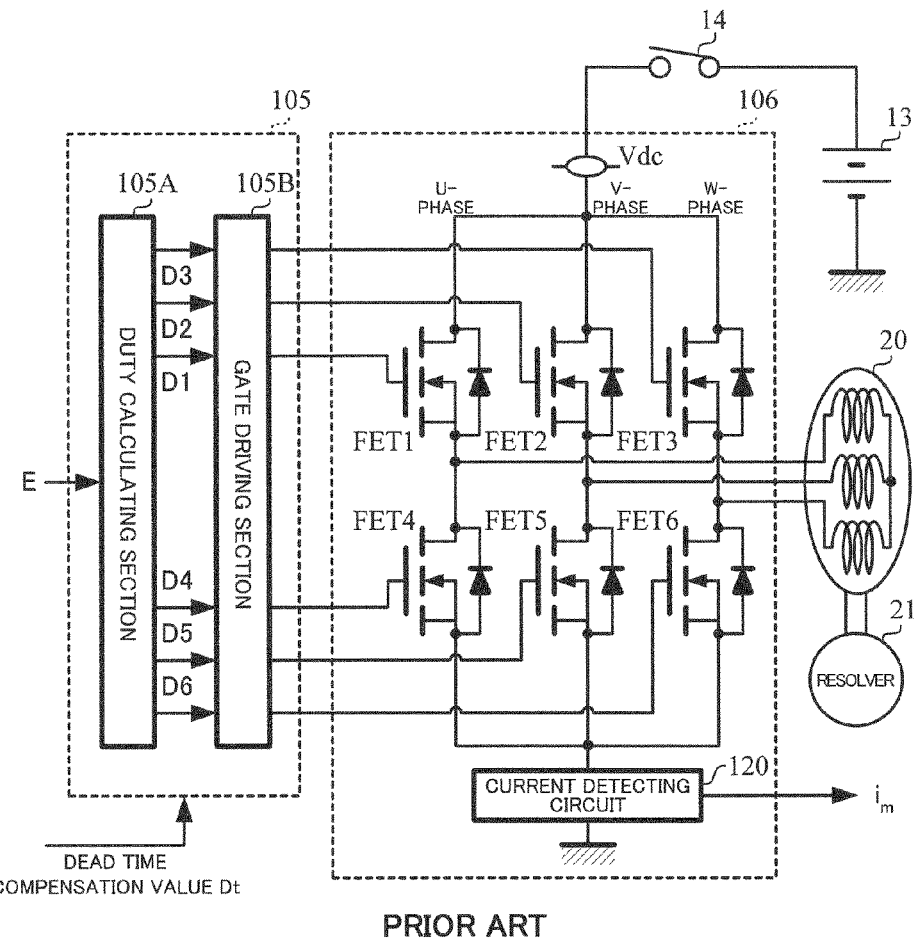
FIG. 3 is a wiring diagram showing a configuration example of a PWM control section and an inverter.
Figure 4:
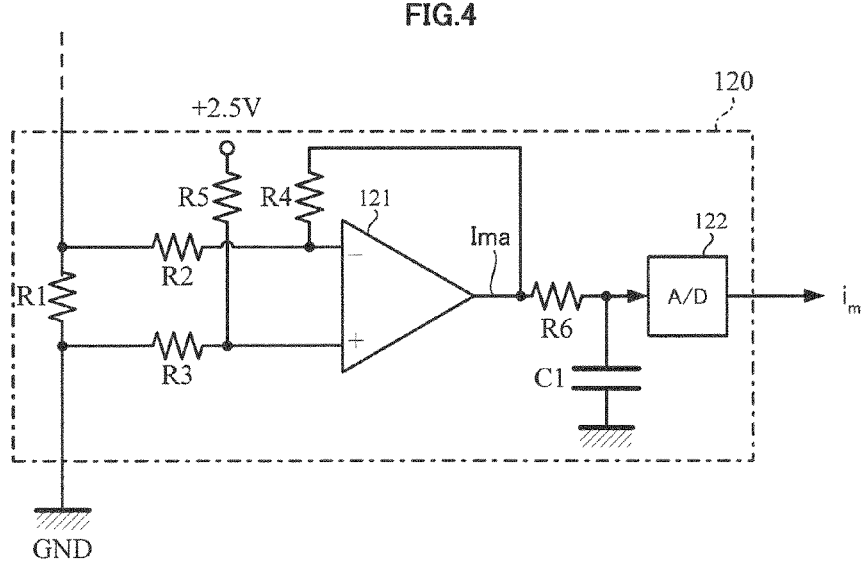
FIG. 4 is a wiring diagram showing a configuration example of a one-shunt type current detector.
Figure 5:
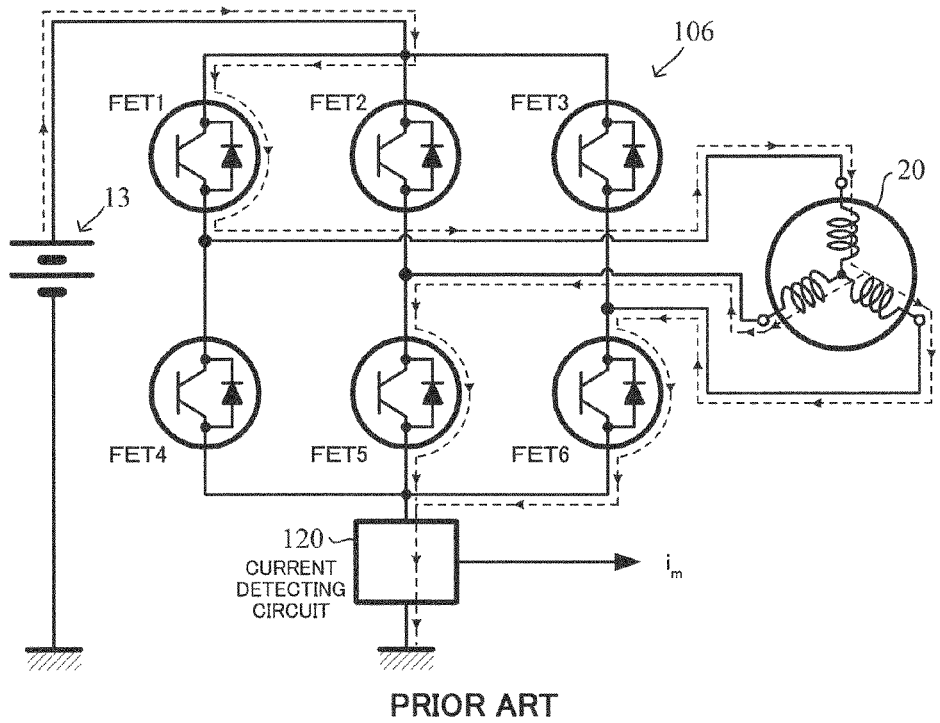
FIG. 5 is a current pathway diagram showing one operation example of an inverter equipped with a one-shunt type current detector.
Figure 6:
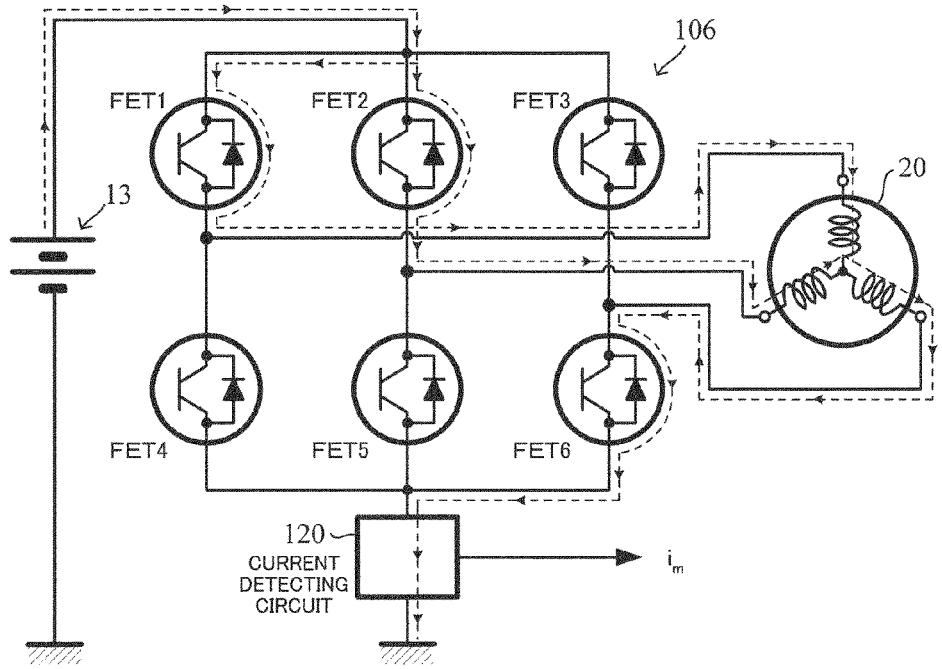
FIG. 6 is a current pathway diagram showing another operation example of the inverter equipped with the one-shunt type current detector.
Figure 7:
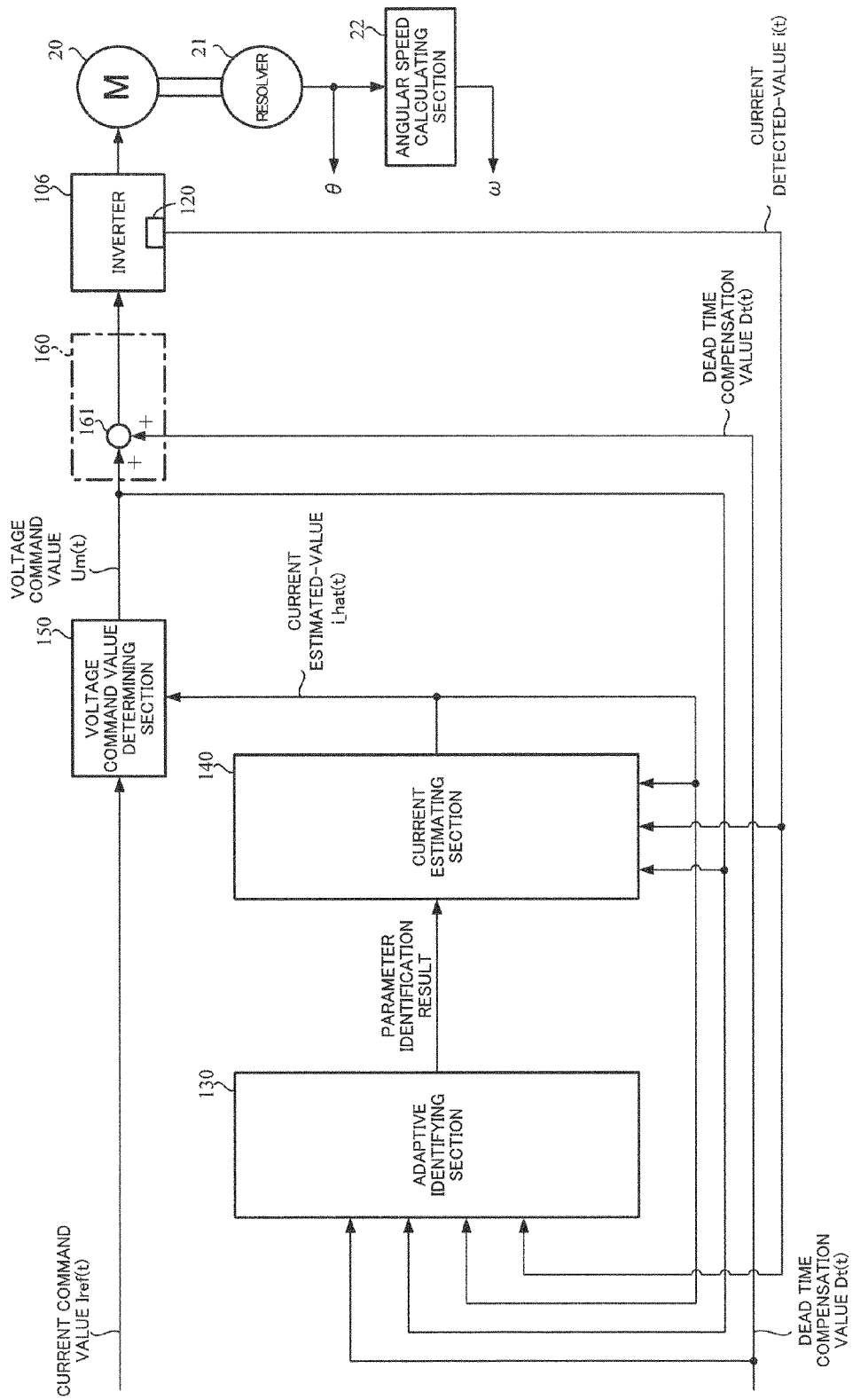
FIG. 7 is a block diagram showing one example of an adaptive current observer becoming the presupposition of the present invention.

In one example shown in FIG. 7 that corresponds to FIG. 2, the adaptive current observer comprises an adaptive identifying section 130, a current estimating section 140, a voltage command value determining section 150 and a PWM control section 160.

The adaptive identifying section 130 inputs a current detected-value i(t) detected by a current detecting circuit 120, a current estimated-value i_hat(t) estimated by the current estimating section 140, a voltage command value Um(t) and a dead time compensation value Dt(t), and identifies a variation in each parameter of a motor output model based on an adaptive identification rule. In this way, influences of variations in electrical characteristic parameters of the motor due to temperature variation, manufacturing unevenness, aging degradation and so on are canceled, and a current-estimation precision is improved. Moreover, as the adaptive identification rule used in the adaptive identifying section 130, although there are various identification rules such as an integral-type adaptive identification rule, a proportional-integral-type adaptive identification rule, a least square adaptive identification rule or a direct identification method using a state variable filter, if it is possible to identify the variation in each parameter of the output model of the motor 20, it is possible to use any one of them.

The current estimating section 140 inputs identification results of each parameter that are identified by means of the adaptive identifying section 130, the current estimated-value i_hat(t), the current detected-value i(t) and the voltage command value Um(t) to estimate a current that flows in the motor 20, and calculates the current estimated-value i_hat(t).

The voltage command value deciding section 150 inputs a current command value Iref(t) and the current estimated-value i_hat(t), and calculates the voltage command value Um(t) so that the motor current becomes the current command value Iref(t).

The PWM control section 160 adds the dead time compensation value Dt(t) to the voltage command value Um(t) calculated by the voltage command value deciding section 150 in an adding section 161, inputs duty command values of PWM control to the inverter 106, and drives the motor 20.

In such a configuration, since the adaptive current observer performs a feedforward control by using the calculated current estimated-value i_hat(t) without performing a control using the current detected-value i(t) as a normal feedback control, it is hard to be affected by input disturbances such as current detection noises. In this way, it is possible to use a simple control method, and it is possible to enhance control responses and improve the operation sound performance and the torque ripple performance. Further, one-shunt current detecting type that it is cheap and downsizing is possible, is used as the current detection type.

Hereinafter, as an example, a concrete configuration of a motor control apparatus that the adaptive identifying section 130 uses the integral-type adaptive identification rule and the current estimating section 140 comprises a state feedback section, will be described.

With respect to the motor 20 that is a control subject, when setting the input as a voltage Vm and setting the output as a current $i_m$, an electrical characteristic equation is led to an equation as shown in the following Expression 1.

$$V_m(t) = R_m i_m(t) + L_m \frac{d}{dt} i_m(t)$$ [Expression 1]

where, $V_m(t)$: an applied voltage between single-phase coils, $i_m(t)$: a current, $R_m$: a resistance of a single-phase coil, and $L_m$: an inductance of a single-phase coil.

Here, the applied voltage $V_m(t)$ between single-phase coils is a voltage that is generated by the PWM and applied to the motor 20 after the voltage command value Um(t) outputted from a control section is converted into the duty based on an ECU-input voltage detected-value $V_r(t)$ and added to the dead time compensation value Dt(t) that compensates a dead time characteristic of the inverter 106. When setting a detection error of an ECU-input voltage as $\Delta_v V_r(t)$, and setting a dead time compensation error as $\Delta_d D_t(t)$ because the dead time compensation value is different from the real value of the dead time, the following Expression 2 holds.

$$\frac{u_m(t)}{Vr(t)} + Dt(t) = \text{Duty}(t)$$ [Expression 2]

$$[\text{Duty}(t) - (\Delta_d Dt(t) + Dt(t))] \times (\Delta_V Vr(t) + Vr(t)) = V_m(t)$$

When eliminating the duty by using the above Expression 2, the following Expression 3 is obtained.

$$V_m(t) = (1-\Delta_v)[u_m(t) - (\Delta_d \times Vr)Dt(t)]$$ [Expression 3]

By substituting the above Expression 3 into the Expression 1 and solving with respect to a differential value of the current $i_m$, the following Expression 4 is obtained.

$$\frac{d}{dt} i_m(t) = -\frac{R_m}{L_m} i_m(t) + \frac{(1+\Delta_V)}{L_m}(u_m(t) - (\Delta_d \times Vr)Dt(t))$$ [Expression 4]

Here, by setting a state "$x_m(t) = i_m(t)$" and an output "$y_m(t) \; x_m(t)$", it is possible to derive a motor continuous-time state equation represented by the following Expression 5.

$$\begin{cases} \frac{d}{dt} x_m(t) = A_m x_m(t) + B_m(u_m(t) + \Delta ev \times Dt(t)) \\ y_m(t) = C_m x_m(t) \end{cases}$$ [Expression 5]

$$A_m = -\frac{R_m}{L_m}$$

$$B_m = \frac{(1+\Delta_V)}{L_m}$$

$$C_m = 1$$

$$\Delta ev = \Delta_d \times Vr$$

With respect to the above expression 5, it is thought to configure the current estimating section 140 that estimates the motor current so as to realize the following Expression 6.

$$\begin{cases} \frac{d}{dt}\hat{x}(t) = A\hat{x}(t) + Bu(t) \\ \hat{y}(t) = C\hat{x}(t) \end{cases} \quad \text{[Expression 6]}$$

$$A = -\frac{R}{L} < 0, \ B = \frac{1}{L} > 0, \ C = 1$$

where,
$\hat{x}(t), \hat{y}(t)$: current estimated-values,
$u(t)$: a control input,
R: a nominal resistance value, and
L: a nominal inductance value.

A current estimation error $e(t)$ is defined as a difference between the current estimated-value and the motor current detected-value, and is expressed as the following Expression 7.

$$e(t) = \hat{y}(t) - y_m(t) = \hat{x}(t) - x_m(t) \quad \text{[Expression 7]}$$

Then, by converting the Expression 7 into an integral equation, that is, by substituting the above Expression 5 and Expression 6 into the Expression 7, the following Expression 8 is obtained.

$$\begin{aligned} \frac{d}{dt}e(t) &= \frac{d}{dt}\hat{x}(t) - \frac{d}{dt}x_m(t) \\ &= A\hat{x}(t) + Bu(t) - A_m x_m(t) - B_m u_m(t) - B_m \Delta ev \times Dt(t) \\ &= Ae(t) + (A - A_m)x_m(t) - B_m u_m(t) - B_m \Delta ev \times Dt(t) + Bu(t) \end{aligned} \quad \text{[Expression 8]}$$

The first term of the right-hand side of the above Expression 8 is an error convergence term, because "A<0" holds. The second term to the fourth term of the right-hand side of the Expression 8 are terms that represent estimation errors, and the fifth term is a control input term. In accordance with the Expression 8, the control input $u(t)$ is set as Expression 9.

$$u(t) = Ke \cdot e(t) + K_x(t) \cdot x_m(t) + K_u(t) \cdot u_m(t) + K_{dt}(t) \cdot Dt(t) \quad \text{[Expression 9]}$$

where,
Ke: a state feedback gain that establishes a natural response frequency of the current estimating section with respect to the estimation error (is also a gain that absorbs modelization errors and establishes stability of the adaptive identification),
$K_x(t)$: an adaptive identification gain for suppressing the influence of the second term of the Expression 8,
$K_u(t)$: an adaptive identification gain for suppressing the influence of the third term of the Expression 8, and
$K_{dt}(t)$: an adaptive identification gain for suppressing the influence of the fourth term of the Expression 8.

By substituting the above Expression 9 into the Expression 8, an estimation error equation represented by the following Expression 10 is obtained.

$$\frac{d}{dt}e(t) = (A + BKe)e(t) + B\left[K_x(t) - \frac{A_m - A}{B}\right]x_m(t) + B\left[K_u(t) - \frac{B_m}{B}\right]u_m(t) + B\left[K_{dt}(t) - \frac{B_m \Delta ev}{B}\right]Dt(t) \quad \text{[Expression 10]}$$

If respective adaptive identification gains of the second~forth terms of the right-hand side of the above Expression 10 that represent the estimation errors are calculated as the following Expression 11, the second~fourth terms of the right-hand side become "0". Since only the first term that is the error convergence term remains, the estimation error converges on "0".

$$K_x(t) = \frac{A_m - A}{B} = S_x \quad \text{[Expression 11]}$$

$$K_u(t) = \frac{B_m}{B} = S_u$$

$$K_{dt}(t) = \frac{B_m \Delta ev}{B} = S_{dt}$$

Here, identifying calculations of the respective adaptive identification gains Kx, Ku and Kdt are derived by using the Lyapunov stability theory. The Lyapunov stability theory is a method that establishes a certain positive-definite function (the solution is certainly more than or equal to "0") as a Lyapunov function V, and derives the solution by using that the Lyapunov function converges on "0" when a differential $dV/dt$ of the Lyapunov function V becomes less than or equal to zero. As a candidate of the Lyapunov function, a positive-definite function represented by the following Expression 12 is chosen.

$$V = e(t)^2 + B\Gamma_x^{-1}[K_x(t) - S_x]^2 + B\Gamma_u^{-1}[K_u(t) - S_u]^2 + B\Gamma_{dt}^{-1}[K_{dt}(t) - S_{dt}]^2 \quad \text{[Expression 12]}$$

where,
$\Gamma_x$, $\Gamma_u$ and $\Gamma_{dt}$ are positive definite values (values that are more than or equal to zero). The first term is a term that represents convergence of the current estimation error. The second~fourth terms are terms that represent convergences to true values of the adaptive identification gains Kx, Ku and Kdt.

By calculating the differential of the above Expression 12 and substituting the Expression 10, the following Expression 13 is obtained.

$$\begin{aligned} \frac{d}{dt}V &= 2e(t) \cdot \frac{d}{dt}e(t) + 2B\Gamma_x^{-1}[K_x(t) - S_x] \cdot \frac{d}{dt}K_x(t) + \\ &\quad 2B\Gamma_u^{-1}[K_u(t) - S_u] \cdot \frac{d}{dt}K_u(t) + \\ &\quad 2B\Gamma_{dt}^{-1}[K_{dt}(t) - S_{dt}] \cdot \frac{d}{dt}K_{dt}(t) = \\ &\quad 2(A + BKe)e(t)^2 + 2B[K_x(t) - S_x]x_m(t) \cdot e(t) + \\ &\quad 2B\Gamma_x^{-1}[K_x(t) - S_x] \cdot \frac{d}{dt}K_x(t) + \\ &\quad 2B[K_x(t) - S_x]u_m(t) \cdot e(t) + \\ &\quad 2B\Gamma_u^{-1}[K_u(t) - S_u] \cdot \frac{d}{dt}K_u(t) + \\ &\quad 2B[K_{dt}(t) - S_{dt}]Dt(t) \cdot e(t) + \end{aligned} \quad \text{[Expression 13]}$$

-continued $$2B\Gamma_{dt}^{-1}[K_{dt}(t) - S_{dt}] \cdot \frac{d}{dt}K_{dt}(t)$$

Based on the Expression 13, calculating the state feedback gain Ke and the adaptive identification gains Kx, Ku and Kdt (that is, configuring the adaptive identifying section 130 and the current estimating section 140) is performed as the following Expression 14.

[Expression 14]

$$Ke < 0$$

$$\begin{cases} K_x(t) = -\frac{1}{s}\Gamma_x x_m(t) \cdot e(t) \\ K_u(t) = -\frac{1}{s}\Gamma_u x_m(t) \cdot e(t) \\ K_{dt}(t) = -\frac{1}{s}\Gamma_{dt} Dt(t) \cdot e(t) \end{cases} \longrightarrow \begin{cases} \frac{d}{dt}K_x(t) = -\Gamma_x x_m(t) \cdot e(t) \\ \frac{d}{dt}K_u(t) = -\Gamma_u x_m(t) \cdot e(t) \\ \frac{d}{dt}K_{dt}(t) = -\Gamma_{dt} Dt(t) \cdot e(t) \end{cases}$$

In general, an adaptive identification rule such as the Expression 14 is referred to as an integral-type adaptive identification rule. $\Gamma_x$, $\Gamma_u$ and $\Gamma_{dt}$ are positive definite value gains, since deciding identification sensitivities (speeds) of the adaptive identification gains Kx, Ku and Kdt, hereinafter referred to as identification sensitivity gains. By setting the identification sensitivity gains $\Gamma_x$, $\Gamma_u$ and $\Gamma_{dt}$ as the Expression 14, a differential of the Lyapunov function becomes the following Expression 15.

[Expression 15]

$$\frac{d}{dt}V = 2(A + Bke)e(t)^2$$

Here, since "A<0", "B>0" and "Ke<0" hold, becoming "dV/dt<0", the Lyapunov function V converges on zero. That is, the current estimation error e(t) converges on zero, and the adaptive identification gains Kx, Ku and Kdt converge on true values.

As described above, finally, it is possible to configure the adaptive identifying section 130 and the current estimating section 140 in accordance with the following Expression 16.

[Expression 16]

the current estimating section:

$$\begin{cases} \frac{d}{dt}\hat{x}(t) = A\hat{x}(t) + Bu(t) \\ \hat{y}(t) = C\hat{x}(t) \end{cases}$$

$$\left(A = -\frac{R}{L}, B = \frac{1}{L}, C = 1\right)$$

the control input:

$$u(t) = Ke \cdot e(t) + K_x(t) \cdot x_m(t) + K_u(t) \cdot u_m(t) + K_{dt}(t) \cdot Dt(t)$$

$$(Ke < 0)$$

$$e(t) = \hat{y}(t) - y_m(t) = \hat{x}(t) - x_m(t)$$

the adaptive identifying section:

$$\begin{cases} K_x(t) = -\frac{1}{s}\Gamma_x x_m(t) \cdot e(t) \\ K_u(t) = -\frac{1}{s}\Gamma_u x_m(t) \cdot e(t) \\ K_{dt}(t) = -\frac{1}{s}\Gamma_{dt} Dt(t) \cdot e(t) \end{cases}$$

$$(\Gamma_x > 0, \Gamma_u > 0, \Gamma_{dt} > 0)$$

where,
$\hat{y}(t) = \hat{x}(t) = \hat{i}(t)$: the current estimated-value,
$x_m(t) = i(t)$: the current detected-value, and
$e(t) = \hat{i}(t) - i(t)$: the current estimation error.

Figure 8:
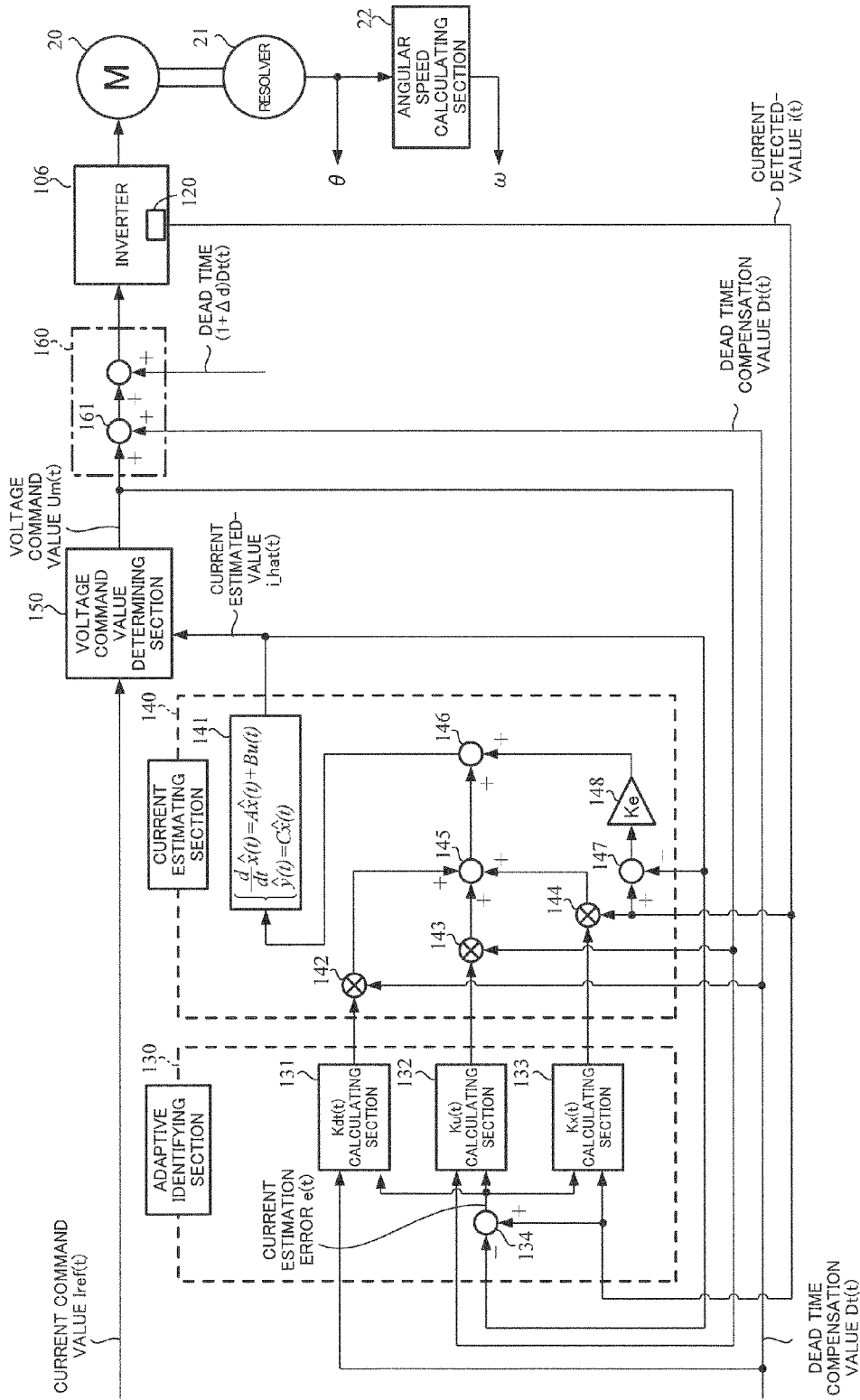
FIG. 8 is a block diagram showing one example that the adaptive current server is applied to a motor control apparatus.

FIG. 8 is a block diagram showing an example of the motor control apparatus comprising the adaptive identifying section 130 and the current estimating section 140 that are defined by the Expression 16. The adaptive identifying section 130 uses the integral-type adaptive identification rule represented by the Expression 16 as its adaptive identification rule, and comprises an adaptive identification gain Kdt(t) calculating section 131 that inputs the dead time compensation value Dt(t) and the current estimation error e(t), an adaptive identification gain Ku(t) calculating section 132 that inputs the voltage command value Um(t) and the current estimation error e(t), an adaptive identification gain Kx(t) calculating section 133 that inputs the motor current detected-value i(t) and the current estimation error e(t), and a subtracting section 134 that calculates the current estimation error e(t) by subtracting the current estimated-value i_hat(t) from the motor current detected-value i(t).

The current estimating section 140 comprises a multiplying section 142, a multiplying section 143, a multiplying section 144, an adding section 145, a subtracting section 147, a state feedback section 148, an addition section 146 and a motor characteristic calculating section 141. The multiplying section 142 multiplies the dead time compensation value Dt(t) by the output of the adaptive identification gain Kdt(t) calculating section 131. The multiplying section 143 multiplies the voltage command value Um(t) by the output of the adaptive identification gain Ku(t) calculating section 132. The multiplying section 144 multiplies the motor current detected-value i(t) by the output of the adaptive identification gain Kx(t) calculating section 133. The adding section 145 adds multiplication results of the multiplying sections 142, 143 and 144. The subtracting section 147 subtracts the current estimated-value i_hat(t) from the motor current detected-value i(t) to calculate the current estimation error e(t). The state feedback section 148 inputs the current estimation error e(t) and feeds back with the state feedback gain Ke. The addition section 146 adds a feedback value outputted from the state feedback section 148 to an additional value of the multiplication results of the multiplying sections 142, 143 and 144 calculated by the adding section 145. The motor characteristic calculating section 141 inputs an addition result of the addition section 146 and calculates the current estimated-value i_hat(t) by using an output model of the motor 20 that is defined by the Expression 16.

Next, settings of the respective identification sensitivity gains $\Gamma_x$, $\Gamma_u$ and $\Gamma_{dt}$ will be described. Values of the identification sensitivity gains $\Gamma_x$, $\Gamma_u$ and $\Gamma_{dt}$ are values that control the response of the adaptive identifying section 130, and it is possible to arbitrarily settle the values of the identification sensitivity gains $\Gamma_x$, $\Gamma_u$ and $\Gamma_{dt}$. In general, it is possible to settle the adaptive identification gains Kx, Ku and Kdt so that the adaptive identification gains Kx, Ku and Kdt asymptotically stabilize (converge) within a desired time. However, when setting all of the identification sensitivity gains $\Gamma_x$, $\Gamma_u$ and $\Gamma_{dt}$ as the same value, poles of the respective adaptive identifications become identical, thereby there is a possibility to become an interference state each other. Therefore, it is preferred to set the identification sensitivity gains $\Gamma_x$, $\Gamma_u$ and $\Gamma_{dt}$ as different values, as an example, it is possible to settle a relation between the different values so that as variation widths of elements to identify become large, corresponding identification sensitivity gains $\Gamma_x$, $\Gamma_u$ and $\Gamma_{dt}$ are set highly.

Further, the adaptive identification gains Kx, Ku and Kdt show the motor parameter variation width correlatively. The motor parameter variations also vary with the temperature except for the initial unevenness such as the manufacturing unevenness and the aging degradation. Considering the above matter and in order to realize that convergence times of the adaptive identification gains Kx, Ku and Kdt are not affected by the current detection disturbances, it is preferred to set the adaptive identification gains Kx, Ku and Kdt so as to become late with respect to an electrical time constant of the motor (for example, about 1 second).

Next, setting of the state feedback gain Ke will be described. Since the motor output model from the applied voltage to the current becomes identical with the real motor characteristic by the adaptive identification, the response of the current estimated-value i_hat(t) for the applied voltage becomes a very high response with respect to the modelized element. Further, since the adaptive identification time is set so as to become late with respect to the electrical time constant, it is preferred to also set the state feedback gain Ke that stabilizes the adaptive identification system small.

As described above, since the state feedback gain Ke also has a meaning to set the natural response frequency of the current estimating section 140 for the modelization error, when setting the state feedback gain Ke high, since there is a possibility to become following so as to become highly-sensitive even with respect to the detection disturbances, it is not preferred to set the state feedback gain Ke high. In contrast, by setting the state feedback gain Ke small and setting the natural response frequency small, it is possible to make the current detection disturbances are not sensed and improve the robustness of the whole control system.

Further, although the dead time compensation value Dt(t) is inputted to the adaptive identifying section 130 and the current estimating section 140, the present invention is not limited to that, for example, as the sign of the dead time compensation value Dt(t), it could be a dead time equivalent value that includes at least a potential variation direction information within the dead time, moreover, in the case that the influence of the dead time is small, it is also good that there is no inputting of the dead time compensation value Dt(t) and no the adaptive identification element relating to the dead time.

Moreover, although the modelization error of the current estimating section 140 is considered and the state feedback section 148 is provided, the present invention is not limited to that, in the case that the influence of the modelization error is small, it is also good that there is no the state feedback section 148.

Moreover, in the motor parameter variations, the variation amount in the parameter relating to the resistance value is the largest, and the variation in the inductance component and the variation in the ECU-input voltage are small. For this reason, it is also possible to configure the adaptive identifying section 130 only by the variation in the parameter relating to the resistance, i.e. the adaptive identification gain Kx(t).

Figure 9:
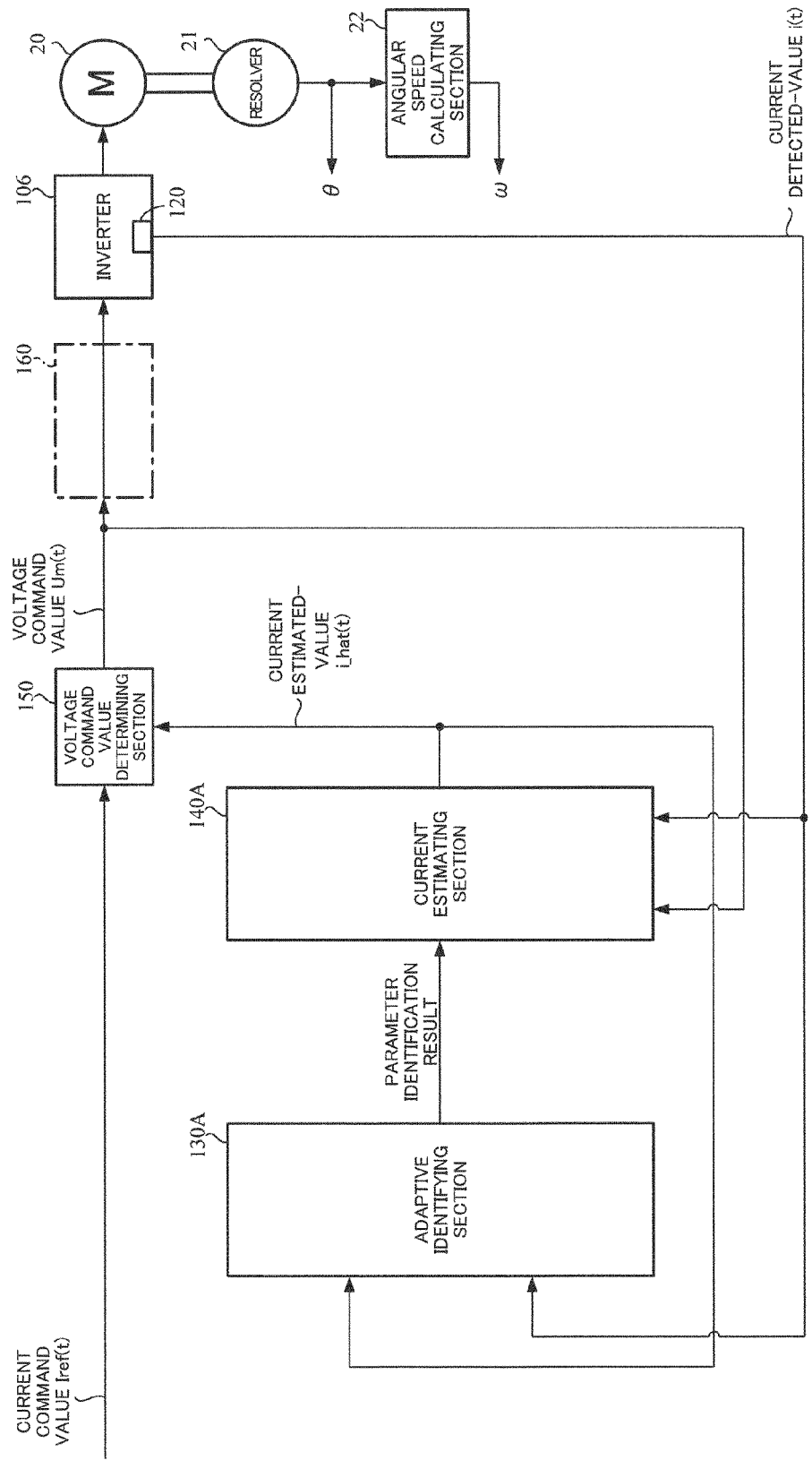
FIG. 9 is a block diagram showing another example of the adaptive current observer becoming the presupposition of the present invention.

In the case that the adaptive identifying section 130 is configured only by the variation in the parameter relating to the resistance and the state feedback section 148 is not comprised, the configuration of the motor control apparatus becomes a configuration as shown in FIG. 9, and configurations of an adaptive identifying section 130A and a current estimating section 140A are the following Expression 17.

the current estimating section: [Expression 17]

$$\begin{cases} \dfrac{d}{dt}\hat{x}(t) = A\hat{x}(t) + Bu(t) \\ \hat{y}(t) + C\hat{x}(t) \end{cases}$$

$$\left(A = -\dfrac{R}{L}, B = \dfrac{1}{L}, C = 1\right)$$

the adaptive identifying section:

$$K_x(t) = -\dfrac{1}{s}\Gamma_x x_m(t) \cdot e(t)$$

$$(\Gamma_x > 0)$$

where,
$\hat{y}(t) = \hat{x}(t) = \hat{i}(t)$: the current estimated-value,
$x_m(t) = i(t)$: the current detected-value, and
$e(t) = \hat{i}(t) - i(t)$: the current estimation error.

Moreover, in the case of using an identification rule that directly identifies the parameter itself of the motor 20 (for example, a direct identification method using a state variable filter) as the adaptive identification rule of the adaptive identifying section 130, since it is possible to directly rewrite coefficients A and B of the current estimating section 140, it is possible to estimate the current estimated-value i_hat(t) only by the parameter identification result and the voltage command value Um(t).

When an estimated-value calculated by the above-described adaptive current observer is used in control, there is a concern about estimation error. In the case that the estimation error broadens, become an unstable control state such as a state that a torque being different from a torque that should be outputted intrinsically, is outputted. In order to prevent such an unstable driving, it is necessary to watch and diagnose abnormality in the current estimated-value, the present invention is intended to meet such a request.

Here, the following four items (a), (b), (c) and (d) can be considered as a part failure countermeasure of the brushless motor.
  (a) an estimated-current is calculated in accordance with driving state of the brushless motor.
  (b) in the case that this estimated-current value is larger than a judgment value, a counting value is increased or it is judged to be abnormality at this time.
  (c) in the case that the above counting value is large than a given value, it is judged to be abnormality.
  (d) in the case of being judged to be abnormality, an abnormality judgment process such as duty limit or shut-down is performed.

Among such part failure countermeasures of the brushless motor, as countermeasures that judge the failures based on the estimated-current, for example, there are control apparatuses disclosed in Japanese Published Unexamined Patent Application No. 2009-131069 A (Patent Document 3) and Japanese Published Unexamined Patent Application No. 2009-124782 A (Patent Document 4). However, in the control apparatuses of the above-described Patent Documents 3 and 4, since both apparatuses do not diagnose accuracy of the estimated-current that is calculated, there is a problem that a case using an incorrect estimated-current and performing an incorrect judgment process happens. In order to solve the above problem, the present invention comprises four watching functions that will be described later and a valuation function that synthetically values these watched results, and performs a diagnosis. In the case of detecting and confirming abnormality by means of synthesis valuation, forcibly make a current-detection-possible state by limiting the duty. That is to say, switch from a current control based on an estimated-current to a current control based on a detected current.

Figure 10:
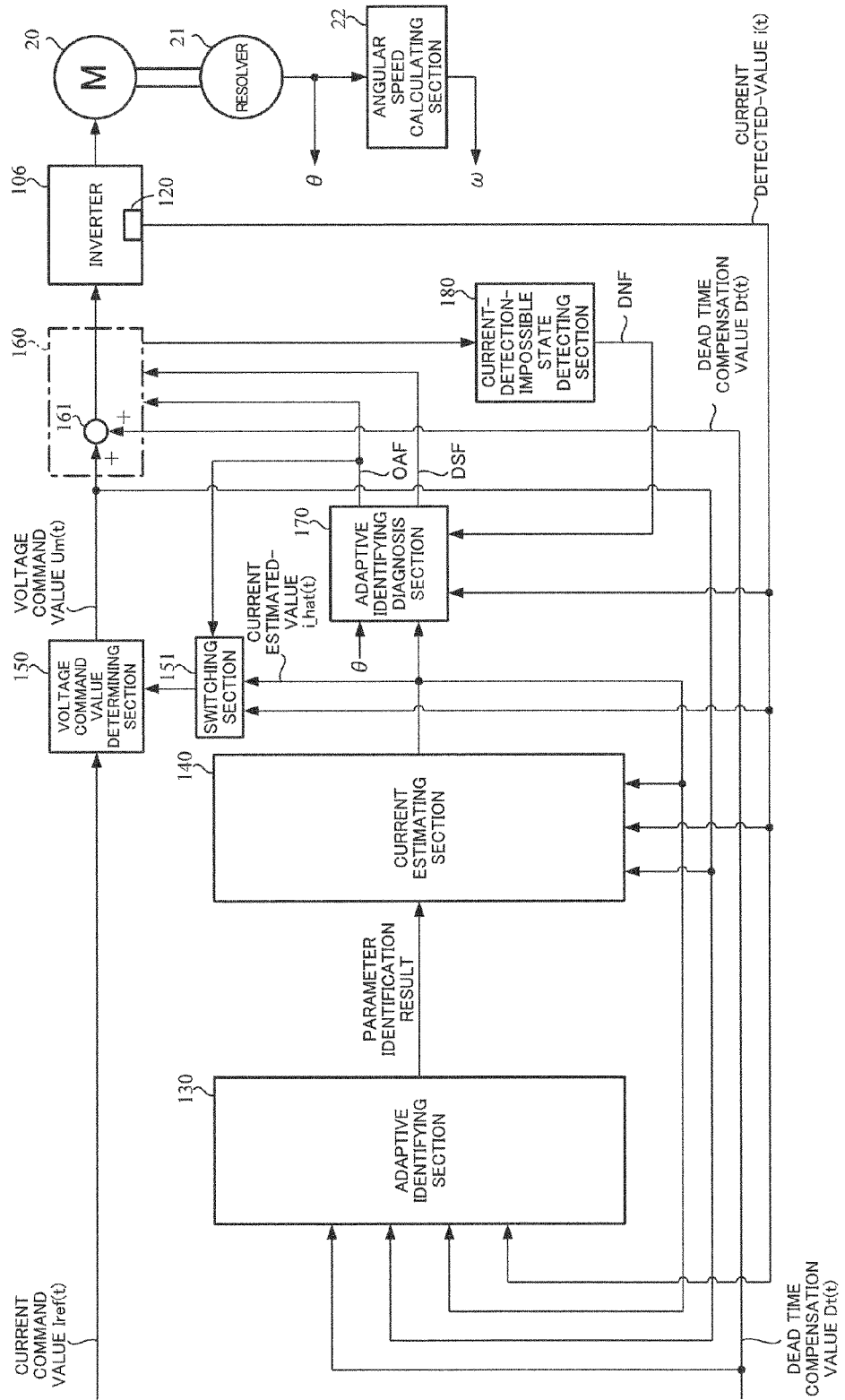
FIG. 10 is a block diagram showing one example of a motor control apparatus according to an embodiment of the present invention.

FIG. 10 shows a configuration example of the present invention that corresponds to FIG. 7, an adaptive identifying diagnosis section 170, a current-detection-impossible state detecting section 180 and a switching section 151 are further provided. The current-detection-impossible state detecting section 180 detects a current-detection-impossible state (or a current-detection-possible state) based on duty command values of the PWM control section 160, and when detecting the current-detection-impossible state, turn ON a current-detection-impossible state flag "DNF" and input to the adaptive identifying diagnosis section 170. Further, the adaptive identifying diagnosis section 170 diagnoses based on the current estimated-value i_hat(t) outputted from the current estimating section 140, the current detected-value i(t), the angle θ and the current-detection-impossible state flag "DNF", and ON/OFF outputs an observer diagnosis abnormality flag "OAF" for controlling the duty and a driving stop flag "DSF" for forbidding assist. In this time, when the observer diagnosis abnormality flag "OAF" for controlling the duty is outputted, since the current estimated-value i_hat(t) is abnormality, the switching section 151 switches from the current estimated-value i_hat(t) to the current detected-value i(t) and inputs the switched output to the voltage command value determining section 150.

Figure 11:
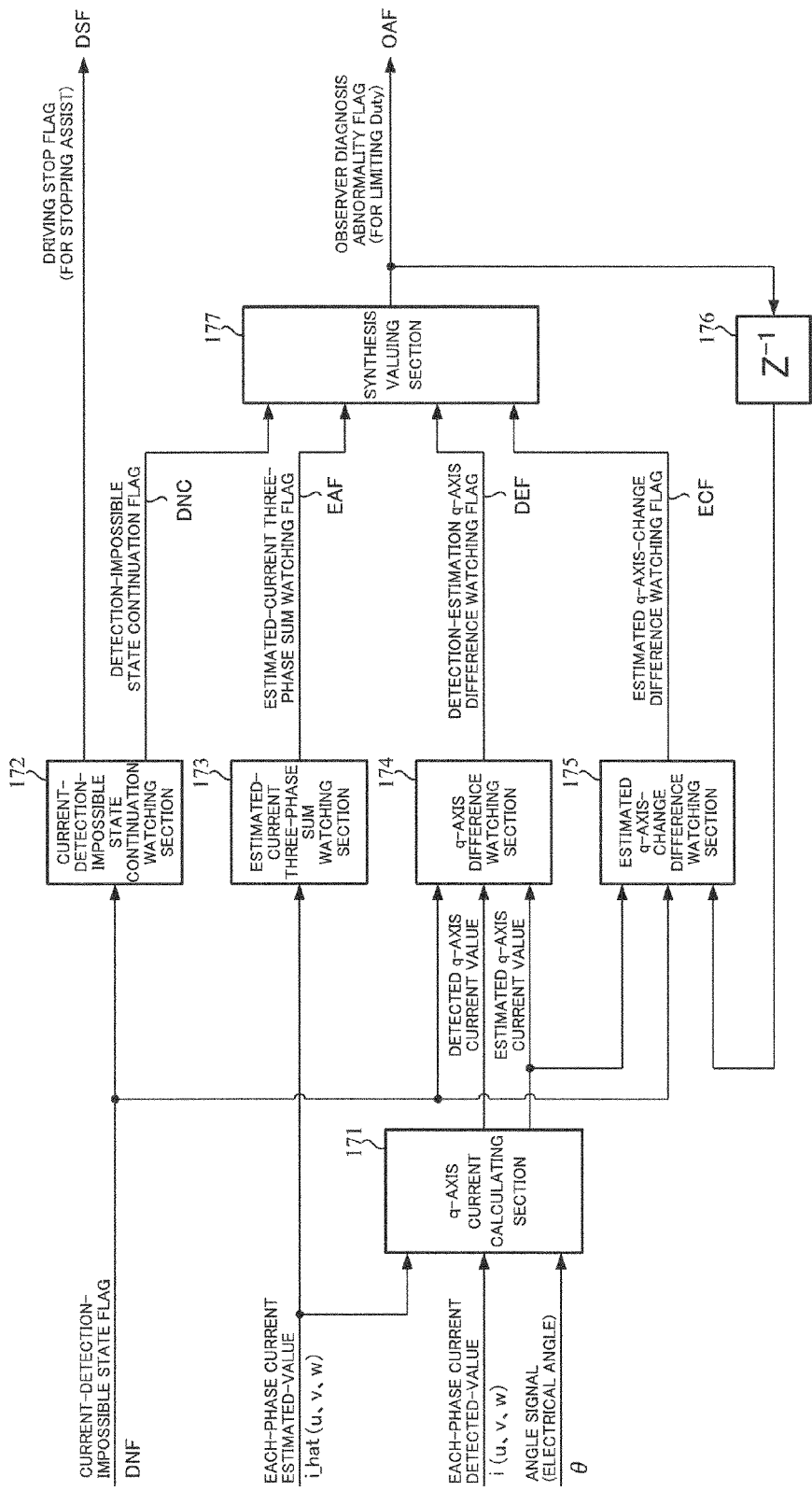
FIG. 11 is a block diagram showing a configuration example of an adaptive identifying diagnosis section according to the present invention.

The details of the adaptive identifying diagnosis section 170 is shown in FIG. 11, the adaptive identifying diagnosis section 170 comprises a q-axis current calculating section 171, a current-detection-impossible state continuation watching section 172, an estimated-current three-phase sum watching section 173, a q-axis difference watching section 174, an estimated q-axis-change difference watching section 175, a synthesis judging section 177 and a holding section 176. The q-axis current calculating section 171 calculates a detected q-axis current value and an estimated q-axis current value based on each-phase current estimated-value i_hat, each-phase current detected-value i and the angle θ. The current-detection-impossible state continuation watching section 172 watches a continuation of the current-detection-impossible state flag "DNF". Based on each-phase current estimated-value i_hat, the estimated-current three-phase sum watching section 173 ON/OFF outputs an estimated-current three-phase sum watching flag "EAF". Based on the current-detection-impossible state flag "DNF", the detected q-axis current value and the estimated q-axis current value, the q-axis difference watching section 174 ON/OFF outputs a detection-estimation q-axis difference watching flag "DEF". The estimated q-axis-change difference watching section 175 ON/OFF outputs an estimated q-axis-change difference watching flag "ECF". The synthesis valuing section 177 performs the synthesis valuation and ON/OFF outputs the observer diagnosis abnormality flag "OAF". The holding section 176 holds a state before one sampling of the observer diagnosis abnormality flag "OAF".

The present invention, as diagnosis functions, has a watching function to watch (constantly watch) the continuation of the current-detection-impossible state, a watching function to watch (constantly watch) three-phase sum of the current estimated-value, a watching function to watch (watch only at the time of current-detection-possible) a difference between the detected q-axis current value and the estimated q-axis current value, a watching function to watch (watch only at the time of current-detection-impossible) a difference of change in the estimated q-axis current value and a valuing function to synthetically value the above each function. Then, in the case of detecting abnormality as a result of the synthesis valuation, the present invention forcibly makes the current-detection-possible state by limiting the duty, and switches from the current control based on the estimated-current calculated by the adaptive current observer to the current control based on the detected current.

Firstly, the watching function to watch (constantly watch) the continuation of the current-detection-impossible state will be described.

Figure 12:
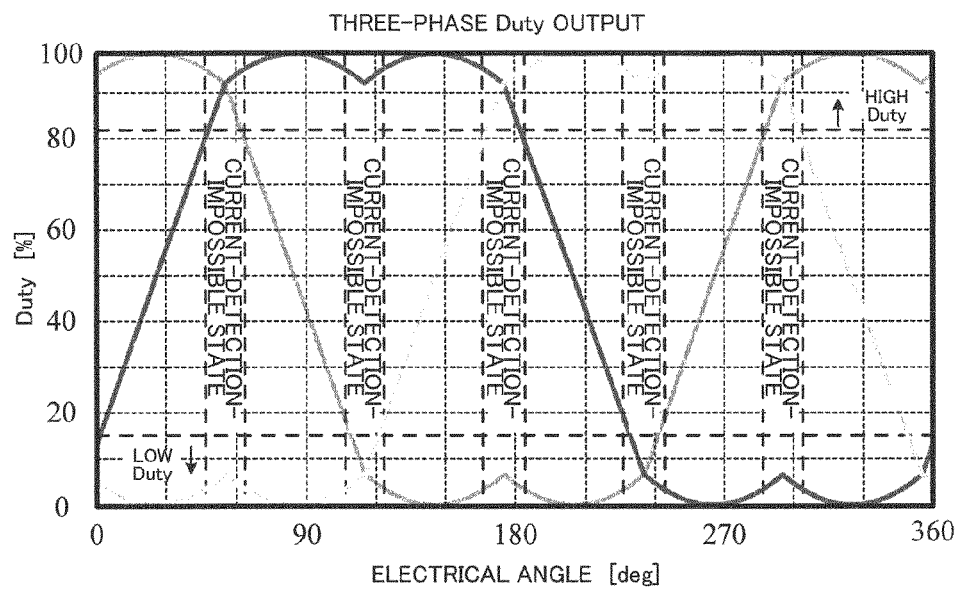
FIG. 12 is a diagram for illustrating functions of the present invention.

As shown in FIG. 12, in three-phase duty output, a timing that becomes the current-detection-impossible state is a case that a used region of a middle-phase duty is low duty or high duty, and the time usually does not continue for several milliseconds. In the present invention, based on each-phase duty outputted from the PWM control section 160, the current-detection-impossible state detecting section 180 detects the current-detection-impossible state, and when becoming the current-detection-impossible state, turn ON the current-detection-impossible state flag "DNF" to output. Then, in the case that duration time of the current-detection-impossible state, i.e. the time when the current-detection-impossible state flag "DNF" is turned ON becomes equal to or more than a given time T1, the current-detection-impossible state continuation watching section 172 judges that there is an abnormality, and turns ON a detection-impossible state continuation flag "DNC" to output. Furthermore, since a case that a state that the current-detection-impossible state flag "DNF" is turned ON continues for a given time T2 or more is obvious abnormality, in order to stop driving, the watching section 172 turns ON the driving stop flag "DSF". This driving stop flag "DSF" does not return. Moreover, at the time that the current-detection-impossible state flag "DNF" is turned OFF, the duration time is reset to zero.

Next, the watching function to watch (constantly watch) the three-phase sum of the current estimated-value will be described.

Figure 13:
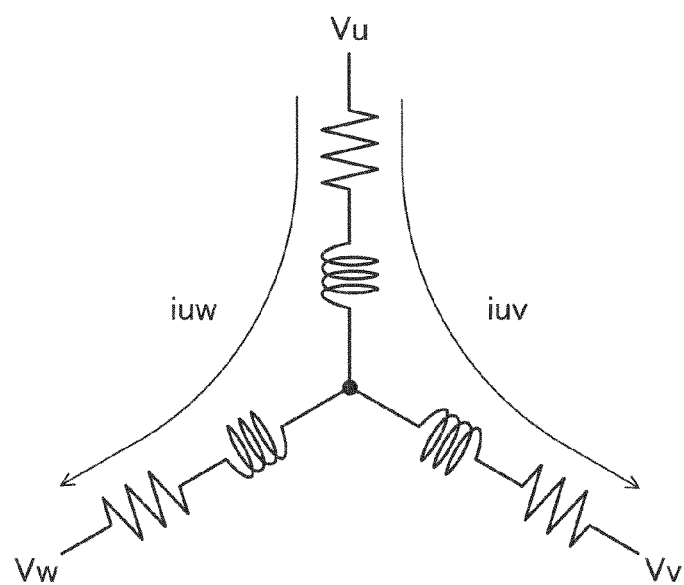
FIG. 13 is a diagram for illustrating functions of the present invention.

Sum of three-phase currents in a star-type motor wiring shown in FIG. 13 has to be zero physically (Kirchhoff's first law). With respect to three-phase current estimated-value calculated by the adaptive current observer, a similar relation is also held. Therefore, based on a relation between sum of each-phase current estimated-value and an error threshold, the estimated-current three-phase sum watching section 173 watches whether calculation of the adaptive current observer is normally performed or not. That is to say, in the case that an absolute value of three-phase sum of three-phase current estimated-values is equal to or more than an error threshold EA1, an error counter #1 is incremented by "1", and in the case that the absolute value of three-phase sum of three-phase current estimated-values is less than the error threshold EA1, the error counter #1 is decremented by "1". Thereafter, it is judged whether a counting value of the error counter #1 is equal to or more than an abnormality threshold or not, in the case of being equal to or more than the abnormality threshold, an abnormality detection is confirmed, and in order to limit the duty, the estimated-current three-phase sum watching flag "EAF" is turned ON. Further, in the case that the counting value of the error counter #1 is less than the abnormality threshold, the estimated-current three-phase sum watching flag "EAF" is turned OFF.

Next, the watching function to watch (watch only at the time of current-detection-possible) the difference between the detected q-axis current value and the estimated q-axis current value will be described.

Figure 14:
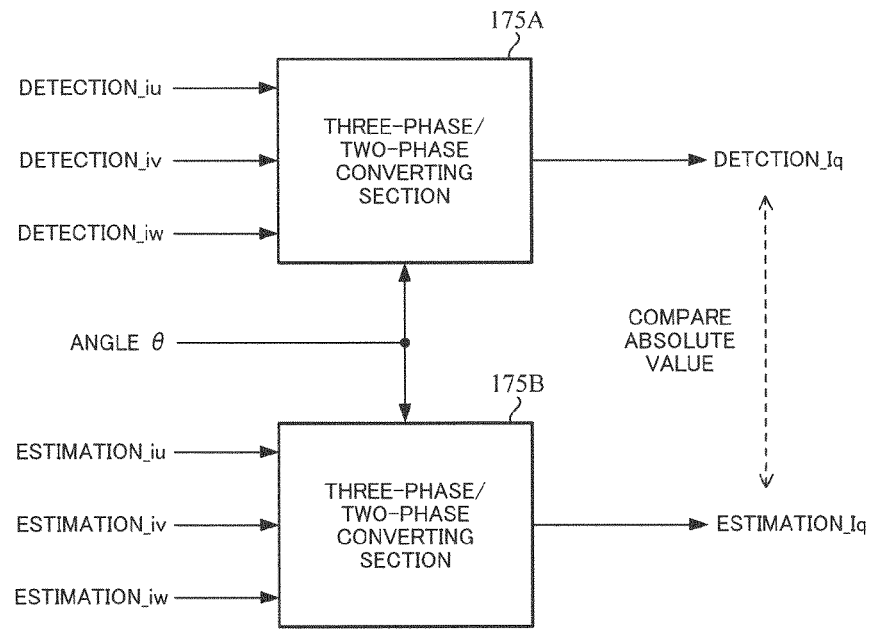
FIG. 14 is a diagram for illustrating functions of the present invention.

Since the q-axis current contributes to the torque, a reason for using the q-axis current is to prevent the unstable driving by comparing the detected q-axis current (corresponding to a detected torque) with the estimated q-axis current (corresponding to an estimated torque). As shown in FIG. 14, the q-axis current is obtained by three-phase/two-phase converting the three-phase current detected-values (detection_iu, detection_iv and detection_iw) in a three-phase/two-phase converting section 175A to calculate the detected q-axis current value (detection_Iq), and by three-phase/two-phase converting the three-phase current estimated-values (estimation_iu, estimation_iv and estimation_iw) in a three-phase/two-phase converting section 175B to calculate the estimated q-axis current value (estimation_Iq). At the time of current-detection-possible, the adaptive current observer works to estimate and calculate an actual current. In the case that an absolute value of a difference between the detected q-axis current value (a currently-outputted torque) and the estimated q-axis current value (a torque being calculated from the current estimated-value) is equal to or more than an error threshold EB1, the q-axis difference watching section 174 judges that the calculation of the adaptive current observer is not normally performed. That is to say, at the time that the current-detection-impossible state flag "DNF" is turned OFF, the q-axis difference watching section 174 increments an error counter #2 by "1" in the case that the absolute value of the difference between the detected q-axis current value and the estimated q-axis current value is equal to or more than the error threshold EB1, decrements the error counter #2 by "1" in the case that the absolute value of the difference between the detected q-axis current value and the estimated q-axis current value is less than the error threshold EB1, confirms the abnormality detection in the case that a counting value of the error counter #2 is equal to or more than an abnormality threshold EB2, and turns ON the detection-estimation q-axis difference watching flag "DEF" to limit the duty. Further, in the case that the counting value of the error counter #2 is less than the abnormality threshold EB2, the watching section 174 turns OFF the detection-estimation q-axis difference watching flag "DEF". At the time that the current-detection-impossible state flag "DNF" is turned ON, the error counter #2 holds a previous value.

Next, the watching function to watch (watch only at the time of current-detection-impossible) the difference of change in the estimated q-axis current value will be described.

Since it is impossible to obtain the current detected-value at the time of current-detection-impossible, a learning function and the state feedback of the adaptive current observer are stopped. However, the current estimated-value is calculated by using a previously-learned adaptive gain. Hence, at the time of current-detection-impossible, the precision of the current estimated-value degrades due to reasons (1) in the case that a previously-learned state is different greatly from a current state, the adaptive gain is not optimal, and (2) there is no state feedback amount.

Figure 15:
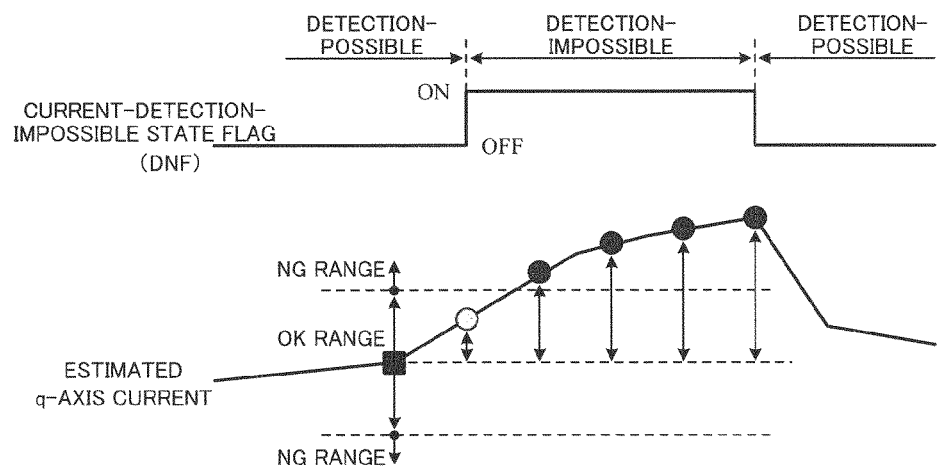
FIG. 15 is a diagram for illustrating functions of the present invention.

With respect to watching the difference of change in the estimated q-axis current value, in the case that an absolute value of a difference between the estimated q-axis current value until just before becoming the current-detection-impossible and the estimated q-axis current value at the time of current-detection-impossible is equal to or more than an error threshold EC1, the q-axis difference watching section 174 judges that the calculation of the adaptive current observer is not normally performed. As shown in FIG. 15, this watching function is a diagnosis processing with respect to a case that it becomes unable to trust the current estimated-value only at the time of current-detection-impossible. The duration time of the current-detection-impossible is short at the time of normal, change amount of the estimated q-axis current value that changes in a short time, is small. It is possible to watch a sign inversion and the change amount by latching the estimated q-axis current just before becoming the current-detection-impossible and comparing an absolute value of a difference with the current estimated q-axis current.

Restoring method of the estimated q-axis-change difference watching flag "ECF" will be described. In order to restore the estimated q-axis-change difference watching flag "ECF", differ from restoring watching flags of the above-described three functions ("DNC", "EAF" and "DEF"), the duty limit flag becomes necessary. That reason is the following (1)~(4).

(1) an error counter #3 updates the value at the time of current-detection-impossible and holds the previous value at the time of current-detection-possible.

(2) when the error counter #3 becomes equal to or more than an abnormality threshold EC2 and the estimated q-axis-change difference watching flag "ECF" is turned ON, the duty is limited.

(3) the error counter #3 becomes the current-detection-possible state based on the duty limit, and continues to hold a value being equal to or more than the abnormality threshold EC2.

(4) the estimated q-axis-change difference watching flag "ECF" does not return.

Therefore, in the case that the duty limit flag (a value before one sampling) is used and the estimated q-axis-change difference watching flag "ECF" is turned ON, the error counter #3 is reset to zero, and then the estimated q-axis-change difference watching flag "ECF" is turned OFF (i.e. restore the estimated q-axis-change difference watching flag "ECF"). The estimated q-axis current value just before becoming the current-detection-impossible is latched. At the time that the current-detection-impossible state flag "DNF" is turned ON, in the case that an absolute value of a difference between the above latched value and the estimated q-axis current value becomes equal to or more than the error threshold EC1, the error counter #3 is incremented by "1". At the time that the current-detection-impossible state flag "DNF" is turned ON, in the case that the absolute value of the difference between the above latched value and the estimated q-axis current value is less than the error threshold EC1, the error counter #3 is decremented by "1". At the time that the current-detection-impossible state flag "DNF" is turned OFF, the error counter #3 holds a previous value. In the case that a counting value of the error counter #3 becomes equal to or more than the abnormality threshold EC2, the abnormality detection is confirmed and the estimated q-axis-change difference watching flag "ECF" is turned ON in order to limit the duty. In the case that the counting value of the error counter #3 is less than the abnormality threshold EC2, the estimated q-axis-change difference watching flag "ECF" is turned OFF. In the case that the duty limit flag (the value before one sampling) is turned ON, the error counter #3 is reset to zero.

The synthesis valuing section 177 synthetically values results of the above-described watching functions and performs confirmation of the abnormality detection or return. In the case that one or more flags that are outputted by the above-described watching are turned ON, the observer diagnosis abnormality flag "OAF" for the duty limit is tuned ON in order to limit the duty. Further, in the case that all of flags that are outputted by the above-described watching are OFF-state and further this OFF-state continues only for a given time T3, turn the observer diagnosis abnormality flag "OAF" for the duty limit is turned OFF.

In such a configuration, the operation example will be described with reference to flow charts of FIG. 16~FIG. 20.

Figure 16:
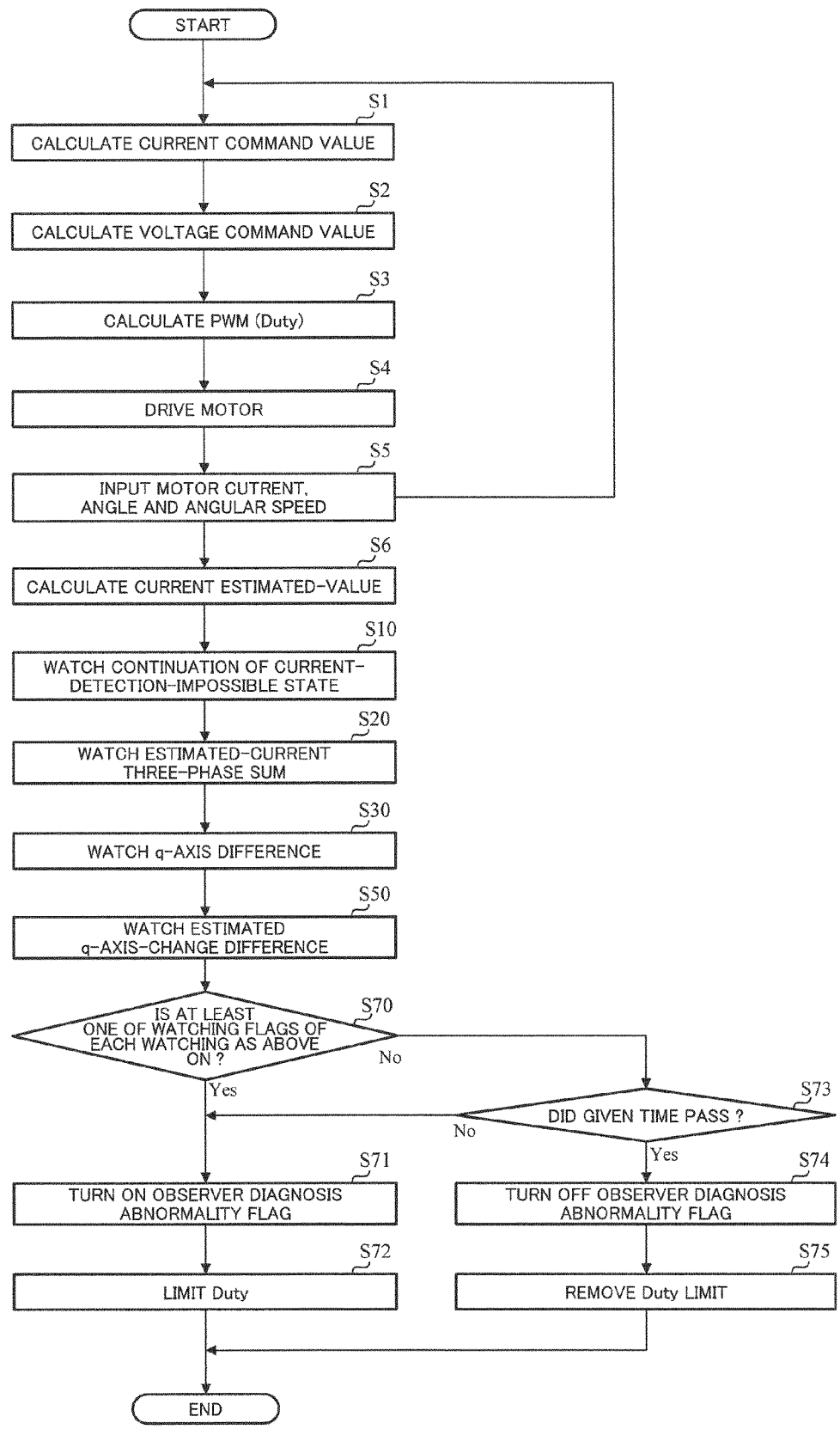
FIG. 16 is a flow chart showing a total operation example of the present invention.

FIG. 16 shows a whole operation example of the present invention, and firstly a current command value is calculated (Step S1), a voltage command value is calculated (Step S2), next duty of PWM is calculated (Step S3) and then the motor is driven (Step S4). Thereafter, a motor current is inputted from the current detecting circuit 120, an angle θ and an angular speed ω of the motor are inputted from a rotation detecting means (Step S5), the above operations are repeated, and simultaneously the current estimated-value is calculated by means of the above-described the adaptive identifying section 130 and the current estimating section 140 (Step S6).

Then, a continuation of the current-detection-impossible state is watched (Step S10), the estimated-current three-phase sum is watched (Step S20), the q-axis difference is watched (Step S30), and further the estimated q-axis-change difference is watched (Step S50). Next, the synthesis valuing section 177 determines whether at least one of the detection-impossible state continuation flag "DNC", the detection-estimation q-axis difference watching flag "DEF", and the estimated q-axis-change difference watching flag "ECF" is turned ON or not (Step S70). In the case that there is at least one flag being turned ON, the synthesis valuing section 177 turns ON the observer diagnosis abnormality flag "OAF" for the duty limit (Step S71), the PWM control section 160 limits the duty (Step S72), and terminate. Further, in the above Step S70, in the case of judging that all of the detection-impossible state continuation flag "DNC", the detection-estimation q-axis difference watching flag "DEF", and the estimated q-axis-change difference watching flag "ECF" are turned OFF, the synthesis valuing section 177 measures an elapsed time and simultaneously judges whether the elapsed time is equal to or more than the given time T3 or not (Step S73). Then, in the case that the elapsed time becomes equal to or more than the given time T3, the observer diagnosis abnormality flag "OAF" is turned OFF (Step S74), the duty limit is removed and is terminated (step S75). Further, in the above Step S73, with respect to the elapsed time, when the given time T3 does not pass, the process goes forward to the above Step S71.

Next, the operation example of each watching will be described in detail.

Figure 17:
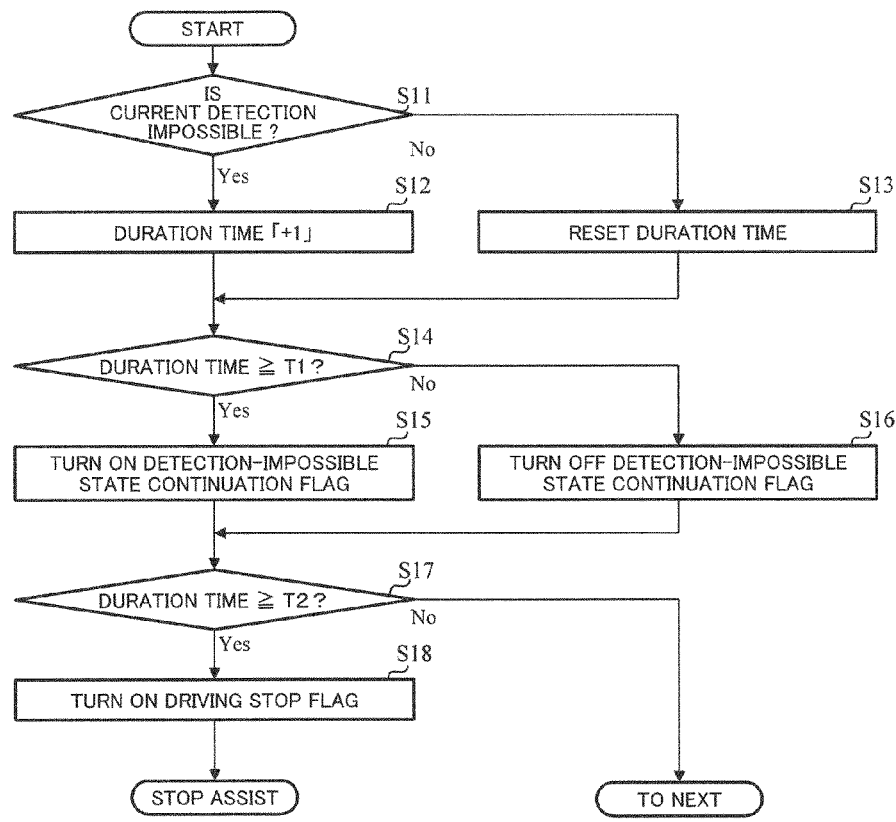
FIG. 17 is a flow chart showing an operation example of current-detection-impossible state continuation watching.

At first, watching the continuation of the current-detection-impossible state (Step S10) is shown as FIG. 17, the current-detection-impossible state continuation watching section 172 judges whether the current detection is impossible or not (Step S11). In the case of judgment that the current detection is impossible, the duration time is incremented by "1" (Step S12), and in the case of judgment that the current detection is possible, the duration time is reset (Step S13). Then, it is judged whether the duration time becomes equal to or more than the given time T1 or not (Step S14). When the duration time becomes equal to or more than the given time T1, the detection-impossible state continuation flag "DNC" is turned ON (Step S15), and when the duration time is less than the given time T1, the detection-impossible state continuation flag "DNC" is turned OFF (Step S16). Further, the current-detection-impossible state continuation watching section 172 judges whether the duration time becomes equal to or more than the given time T2 (>T1) or not (Step S17), when the duration time becomes equal to or more than the given time T2, confirms the abnormality, and turns ON the driving stop flag "DSF" to stop the assist (Step S18). Further, in the case that when the duration time is less than the given time T2, the process is moved to the next watching.

Figure 18:
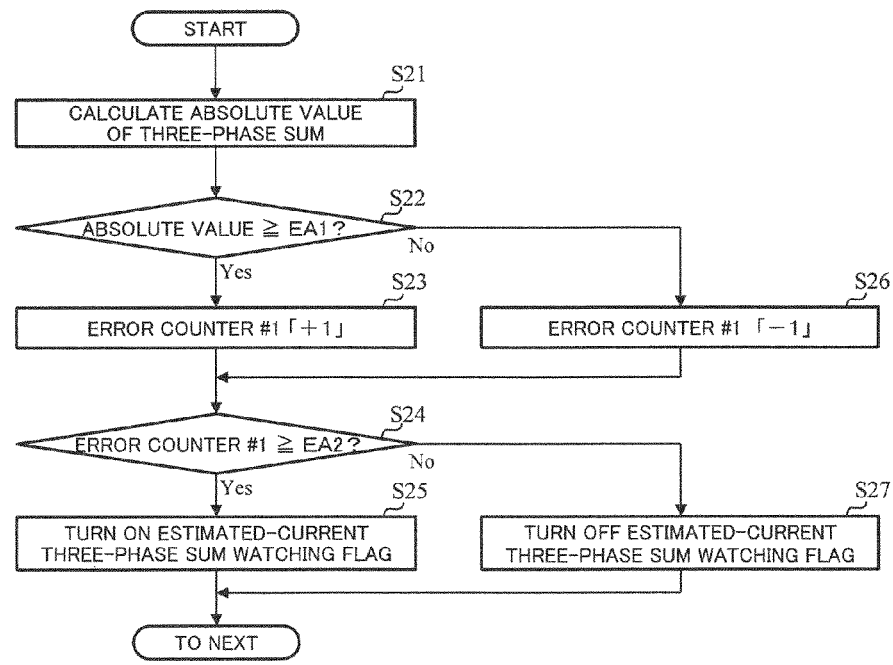
FIG. 18 is a flow chart showing an operation example of estimated-current three-phase sum watching.

Detail operations of the estimated-current three-phase sum watching are shown as FIG. 18, the estimated-current three-phase sum watching section 173 calculates the absolute value of the sum of each-phase current estimated-values (Step S21), and judges whether the absolute value is equal to or more than the error threshold EA1 or not (Step S22). The estimated-current three-phase sum watching section 173 increments the error counter #1 by "1" in the case that the absolute value of the three-phase sum of three-phase current estimated-values is equal to or more than the error threshold EA1 (Step S23), decrements the error counter #1 by "1" in the case that the absolute value of the three-phase sum of three-phase current estimated-values is less than the error threshold EA1 (Step S26), and then judges whether the error counter #1 is equal to or more than the abnormality threshold EA2 (Step S24). In the case that the error counter #1 is equal to or more than the abnormality threshold EA2, the estimated-current three-phase sum watching section 173 confirms the abnormality detection, and turns ON the estimated-current three-phase sum watching flag "EAF" in order to limit the duty (Step S25), in the case that the error counter #1 is less than the abnormality threshold EA2, the estimated-current three-phase sum watching section 173 judges that there is no abnormality, and turns "ON" the estimated-current three-phase sum watching flag "EAF". Thereafter, the process is moved to the next watching (Step S27).

Figure 19:
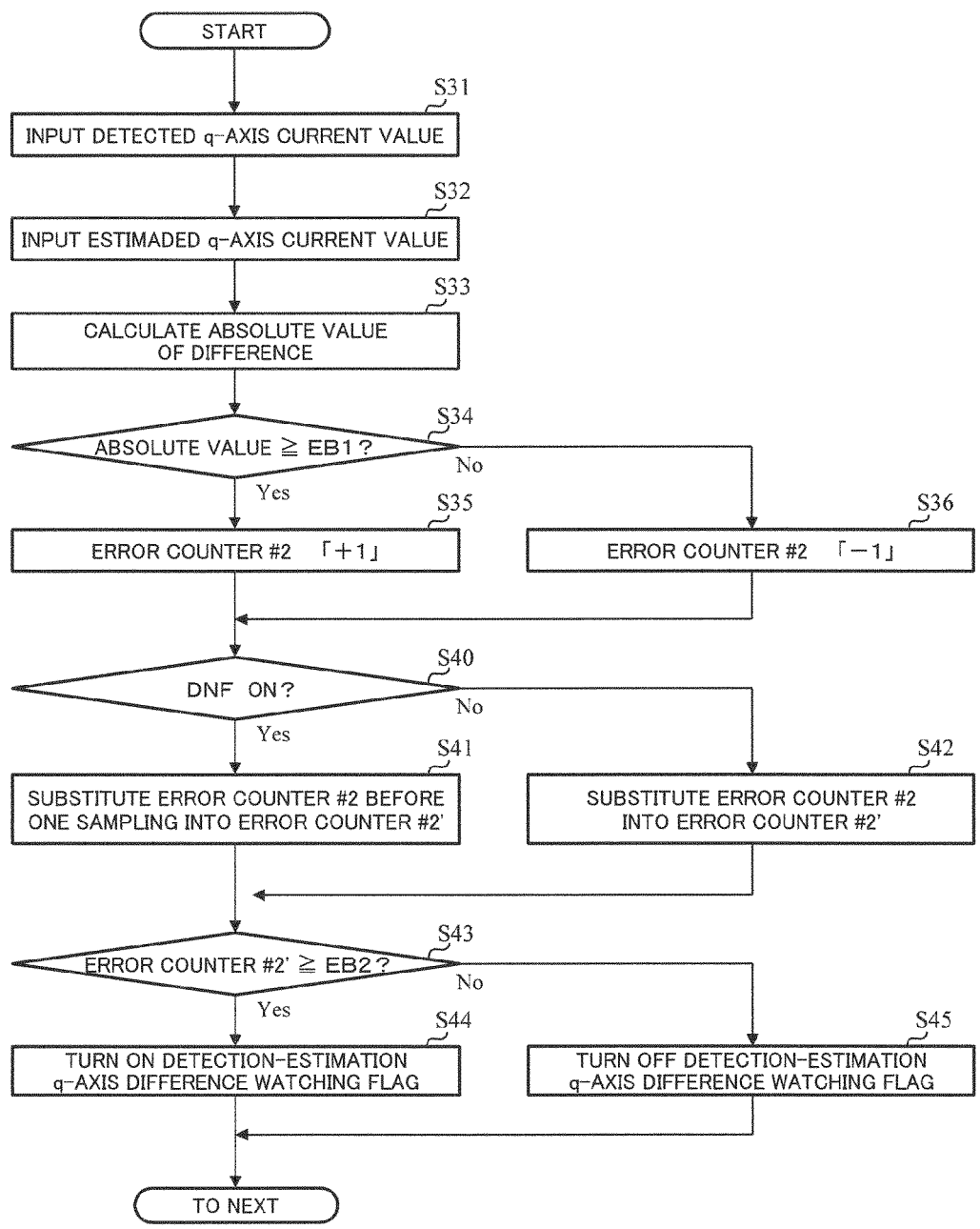
FIG. 19 is a flow chart showing an operation example of q-axis difference watching.

Detail operations of the next q-axis difference watching are shown as FIG. 19, the q-axis difference watching section 174 inputs the detected q-axis current value (Step S31), inputs the estimated q-axis current value (Step S32), calculates the absolute value of the difference between the detected q-axis current value and the estimated q-axis current value (Step S33), and judges whether the absolute value is equal to or more than the error threshold EB1 or not (Step S34). The q-axis difference watching section 174 increments the error counter #2 by "1" in the case that the absolute value is equal to or more than the error threshold EB1 (Step S35), decrements the error counter #2 by "1" in the case that the absolute value is less than the error threshold EB1 (Step S36), and then judges whether the current-detection-impossible state flag "DNF" is turned ON or not (Step S40).

The q-axis difference watching section 174, in the case that the current-detection-impossible state flag "DNF" is turned ON, substitutes the error counter #2 before one sampling into an error counter #2' (Step S41), in the case that the current-detection-impossible state flag "DNF" is turned OFF, substitutes the error counter #2 into the error counter #2' (Step S42), and then judges whether the error counter #2' is equal to or more than the abnormality threshold EB2 (Step S43). The q-axis difference watching section 174, in the case that the error counter #2' is equal to or more than the abnormality threshold EB2, turns "ON" the detection-estimation q-axis difference watching flag "DEF" (Step S44), and in the case that the error counter #2' is less than the abnormality threshold EB2, turns "OFF" the detection-estimation q-axis difference watching flag "DEF" (Step S45).

Figure 20:
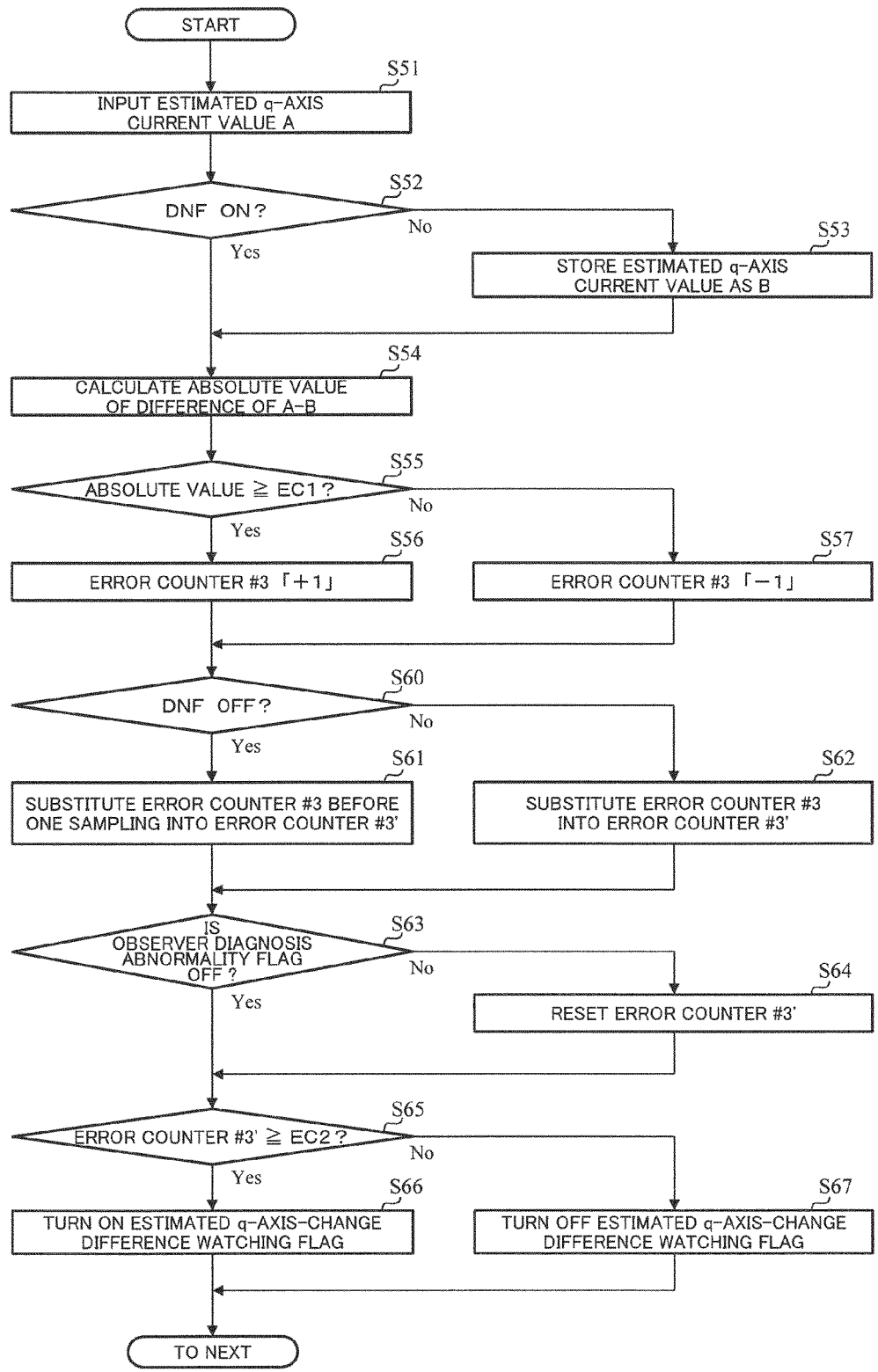
FIG. 20 is a flow chart showing an operation example of estimated q-axis-change difference watching.

Next, detail operations of the estimated q-axis-change difference watching will be described with reference to FIG. 20.

The estimated q-axis-change difference watching section 175 inputs an estimated q-axis current value (A) (Step S51), and judges whether the current-detection-impossible state flag "DNF" is turned ON (Step S52). The estimated q-axis-change difference watching section 175, in the case that the current-detection-impossible state flag "DNF" is turned ON, calculates an absolute value of an stored estimated q-axis current value (B) and the estimated q-axis current value (A) (Step s54), in the case that the current-detection-impossible state flag "DNF" is turned OFF, stores the estimated q-axis current value (Step s53), and calculates an absolute value of a difference between this stored value (B) and the estimated q-axis current value (A) (Step S54). Then, the estimated q-axis-change difference watching section 175 judges whether the absolute value of the difference is equal to or more than the error threshold EC1 or not (Step S55), increments the error counter #3 by "1" in the case that the absolute value becomes equal to or more than the error threshold EC1 (Step S56), decrements the error counter #3 by "1" in the case that the absolute value is less than the error threshold EC1 (Step S57). Next, the estimated q-axis-change difference watching section 175 judges whether the current-detection-impossible state flag "DNF" is turned OFF or not (Step S60).

The estimated q-axis-change difference watching section 175, in the case that the current-detection-impossible state flag "DNF" is turned OFF, substitutes the error counter #3 before one sampling into an error counter #3' (Step S61), and in the case that the current-detection-impossible state flag "DNF" is turned ON, substitutes the error counter #3 into the error counter #3' (Step S62). Next, the estimated q-axis-change difference watching section 175 judges whether the observer diagnosis abnormality flag "OAF" is turned OFF or not (Step S63), in the case that the observer diagnosis abnormality flag "OAF" is turned OFF, judges whether the error counter #3' is equal to or more than the abnormality threshold EC2 (Step S65). Further, the estimated q-axis-change difference watching section 175, in the case that the observer diagnosis abnormality flag "OAF" is turned ON, resets the error counter #3' (Step S64), and then, judges whether the error counter #3' is equal to or more than the abnormality threshold EC2 (Step S65). In the case that the error counter #3' is equal to or more than the abnormality threshold EC2, the estimated q-axis-change difference watching flag "ECF" is turned ON (Step S66), and in the case that the error counter #3' is less than the abnormality threshold EC2, the estimated q-axis-change difference watching flag "ECF" is turned OFF (Step S67).

Moreover, although the order of the watching is described in order of the watching of the continuation of the current-detection-impossible state, the watching of the estimated-current three-phase sum, the watching of the q-axis difference, the watching of the estimated q-axis-change difference as above, it is possible to arbitrarily change the order of the watching.

In the present invention's system, it is possible to use the estimated-current at the time of stationary control and perform the control by means of the detected current after limiting duty at the time of abnormality in the estimated-current diagnosis, and further, it is also possible to use the detected current at the time of stationary control, switch to the estimated-current to control at the time that the current detection becomes impossible, and perform the control by means of the detected current after limiting duty at the time of abnormality in the estimated-current diagnosis.

Explanation of Reference Numerals

| | |
|---|---|
| 1 | handle (steering wheel) |
| 2 | column shaft |
| 10 | torque sensor |
| 12 | velocity sensor |
| 13 | battery |
| 20 | motor |
| 21 | resolver |
| 22 | angular speed calculating section |
| 100 | control unit (ECU) |
| 101 | current command value calculating section |
| 103 | current limiting section |
| 104 | current control section |
| 105 | PWM control section |
| 106 | inverter |
| 110 | compensation section |
| 120 | current detecting circuit |
| 130 | adaptive identifying section |
| 140 | current estimating section |
| 150 | voltage command value determining section |
| 160 | PWM control section |
| 170 | adaptive identifying diagnosis section |
| 171 | q-axis current calculating section |
| 172 | current-detection-impossible state continuation watching section |
| 173 | estimated-current three-phase sum watching section |
| 174 | q-axis difference watching section |
| 175 | estimated q-axis-change difference watching section |
| 176 | holding section |
| 177 | synthesis judging section |
| 180 | current-detection-impossible state detecting section |

The invention claimed is:

1. A motor control apparatus comprising a current detecting circuit to detect a current of a motor as a current detected-value, a drive control unit to drive and control the motor with duty based on a voltage command value determined based on at least a current command value, and a rotation detecting unit to detect an angle and an angular speed of the motor, wherein, the motor control apparatus further comprising:
an adaptive current observer to identify parameter variations of an output model of the motor, to calculate a current estimated-value of the motor and to use the current estimated-value for a calculation of the voltage command value;
an adaptive identifying diagnosis section to diagnose an estimation error of the current estimated-value outputted from the adaptive current observer; and
a current-detection-impossible state detecting section to detect a current-detection-impossible state that a detection of the current detected-value is impossible;
wherein the adaptive identifying diagnosis section diagnoses the estimation error of the current estimated-value based on the current estimated-value, the current detected-value, the angle and the current-detection-impossible state and forcibly makes a current-detection-possible state by limiting the duty based on a diagnosis result of the adaptive identifying diagnosis section, and a control of the motor is switched to a current control based on a detected current.

2. A motor control apparatus according to claim 1, wherein the current detecting circuit is a one-shunt current detecting type.

3. A motor control apparatus according to claim 1, wherein the drive control unit is constructed by a vector control system of d-q axes, and the adaptive identifying diagnosis section comprising:
a q-axis current calculating section to calculate a detected q-axis current value and an estimated q-axis current value based on the current estimated-value, the current detected-value and the angle;

a current-detection-impossible state continuation watching section to watch a continuation of a current-detection-impossible state;

an estimated-current each-phase sum watching section to watch an each-phase sum based on the current estimated-value;

a q-axis difference watching section to watch a detection-estimation q-axis difference based on the current-detection-impossible state, the detected q-axis current value and the estimated q-axis current value;

an estimated q-axis-change difference watching section to watch an estimated q-axis-change difference based on the current-detection-impossible state, the estimated q-axis current value and an estimated q-axis current value just before the current-detection-impossible state; and a synthesis judging section to synthetically judge watched results of the current-detection-impossible state continuation watching section, the estimated-current each-phase sum watching section, the q-axis difference watching section and the estimated q-axis-change difference watching section.

4. A motor control apparatus according to claim 2, wherein the drive control unit is constructed by a vector control system of d-q axes, and the adaptive identifying diagnosis section comprising:

a q-axis current calculating section to calculate a detected q-axis current value and an estimated q-axis current value based on the current estimated-value, the current detected-value and the angle;

a current-detection-impossible state continuation watching section to watch a continuation of a current-detection-impossible state;

an estimated-current each-phase sum watching section to watch an each-phase sum based on the current estimated-value;

a q-axis difference watching section to watch a detection-estimation q-axis difference based on the current-detection-impossible state, the detected q-axis current value and the estimated q-axis current value;

an estimated q-axis-change difference watching section to watch an estimated q-axis-change difference based on the current-detection-impossible state, the estimated q-axis current value and an estimated q-axis current value just before the current-detection-impossible state; and a synthesis judging section to synthetically judge watched results of the current-detection-impossible state continuation watching section, the estimated-current each-phase sum watching section, the q-axis difference watching section and the estimated q-axis-change difference watching section.

5. A motor control apparatus according to claim 3, wherein the synthesis judging section outputs an observer diagnosis-abnormal flag for limiting the duty or a drive stop flag for stopping an assist.

6. A motor control apparatus according to claim 4, wherein the synthesis judging section outputs an observer diagnosis-abnormal flag for limiting the duty or a drive stop flag for stopping an assist.

7. A motor control apparatus according to claim 1, wherein the adaptive current observer comprises an adaptive identifying unit to identify the parameter variations of the output model of the motor, a current estimating unit to estimate a current of the motor and a voltage command value determining unit to determine the voltage command value.

8. A motor control apparatus according to claim 3, wherein the adaptive current observer comprises an adaptive identifying unit to identify the parameter variations of the output model of the motor, a current estimating unit to estimate a current of the motor and a voltage command value determining unit to determine the voltage command value.

9. A motor control apparatus according to claim 5, wherein the adaptive current observer comprises an adaptive identifying unit to identify the parameter variations of the output model of the motor, a current estimating unit to estimate a current of the motor and a voltage command value determining unit to determine the voltage command value.

10. An electric power steering apparatus provided with the motor control apparatus according to claim 1.

* * * * *